United States Patent
Vovos et al.

(10) Patent No.: US 9,950,639 B2
(45) Date of Patent: Apr. 24, 2018

(54) DUAL KALMAN FILTER FOR TORSIONAL DAMPING OF ELECTRIC TRACTION DRIVES

(71) Applicant: BAE SYSTEMS CONTROLS INC., Endicott, NY (US)

(72) Inventors: Robert J. Vovos, Vestal, NY (US); James A. Dupuy, Endicott, NY (US); Arthur P. Lyons, Maine, NY (US)

(73) Assignee: BAE Systems Controls Inc., Endicott, NY (US)

( * ) Notice: Subject to any disclaimer, the term of this patent is extended or adjusted under 35 U.S.C. 154(b) by 44 days.

(21) Appl. No.: 14/888,260

(22) PCT Filed: Feb. 26, 2015

(86) PCT No.: PCT/US2015/017684
§ 371 (c)(1),
(2) Date: Oct. 30, 2015

(87) PCT Pub. No.: WO2015/130901
PCT Pub. Date: Sep. 3, 2015

(65) Prior Publication Data
US 2016/0059735 A1    Mar. 3, 2016

Related U.S. Application Data

(60) Provisional application No. 61/946,556, filed on Feb. 28, 2014.

(51) Int. Cl.
*B60L 9/00*    (2006.01)
*B60L 15/00*    (2006.01)
(Continued)

(52) U.S. Cl.
CPC ............... *B60L 15/20* (2013.01); *B60L 7/14* (2013.01); *B60L 11/126* (2013.01);
(Continued)

(58) Field of Classification Search
CPC .......... B60L 15/20; B60L 7/14; B60L 11/126; B60L 15/2009
(Continued)

(56) References Cited

U.S. PATENT DOCUMENTS

| | | | |
|---|---|---|---|
| 2004/0134267 A1* | 7/2004 | Boesch | B60K 6/445 73/114.62 |
| 2010/0141193 A1* | 6/2010 | Rotondo | F01D 15/08 318/432 |
| 2013/0035838 A1* | 2/2013 | Maier | B60K 6/48 701/99 |

FOREIGN PATENT DOCUMENTS

| | | |
|---|---|---|
| EP | 0953471 | 3/1999 |
| JP | 3244184 | 1/2002 |
| JP | 2010051160 | 3/2010 |

OTHER PUBLICATIONS

PCT/US2015/017684 International Search Report dated May 28, 2015.
(Continued)

*Primary Examiner* — Harry Y Oh
(74) *Attorney, Agent, or Firm* — Scully Scott Murphy & Presser PC

(57) ABSTRACT

In one aspect, a system for torsional damping of electric traction drives comprises dual Kalman filters to correct for oscillations based on measured traction motor speed and commanded traction motor torque. A first Kalman filter can perform a state space estimate of the shaft torque providing negative feedback to the final torque command in order to eliminate resonant components from the commanded torque and quickly damp external disturbances. A second Kalman filter provides a state space estimation of the load torque or, equivalently, load acceleration. This second Kalman filter
(Continued)

can ignore commanded torque and can provide a damping feedback when the wheel speed deviates from the vehicle speed.

12 Claims, 36 Drawing Sheets

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60L 15/20* | (2006.01) |
| *B60L 7/14* | (2006.01) |
| *B60L 11/12* | (2006.01) |

(52) U.S. Cl.
CPC ....... *B60L 15/2009* (2013.01); *B60L 2210/40* (2013.01); *B60L 2240/12* (2013.01); *B60L 2240/421* (2013.01); *B60L 2240/423* (2013.01); *B60L 2240/461* (2013.01); *B60L 2250/12* (2013.01); *B60L 2250/16* (2013.01); *B60L 2270/145* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01)

(58) Field of Classification Search
USPC .......................................................... 701/22
See application file for complete search history.

(56) References Cited

OTHER PUBLICATIONS

Dhaouadi, R. et al., "Robust speed control of rolling mill drive systems using the loop transfer recovery design methodology", Proceedings of the International Conference on Industrial Electronics, Control and Instrumentation (IECON), Oct. 28, 1991.
Hans-Peter, B. et al., "Traction Drive Control With PI State Controller and Kalman Filter—First Experimental Results", 13th Triennial World Congress, San Francisco, California, Jun. 1, 1996.
European Search Report, EP 15754496.6, dated Jan. 22, 2018, 11 pages.

* cited by examiner

DUAL KALMAN FILTER FOR TORSIONAL DAMPING OF ELECTRIC TRACTION DRIVES

CROSS-REFERENCE TO RELATED APPLICATIONS

This application claims the benefit under 35 U.S.C. § 119(e) of U.S. Provisional Application Ser. No. 61/946,556, filed Feb. 28, 2014. The entire contents and disclosure of the aforementioned provisional application is incorporated by reference as if fully set forth herein.

BACKGROUND

Clutch-less series hybrid drivelines behave as a two mass sprung system containing a resonant frequency. The resonant frequency will be excited by commanded torque as well as driveline backlash, anti-lock braking events and road bumps. When excited, the resonance causes an amplified torque oscillation that is damaging to the driveline components. These torsional oscillations cause wear on the driveline, reducing the life of the system.

SUMMARY

Systems, methods, algorithms and computer program products for torsional damping of electric traction drives can comprise a first filter operable to perform a first state space estimate of a shaft torque and a second filter operable to perform a second state space estimation of a load torque, wherein the first and second state space estimations of shaft torque and load torque enable torsional damping of the electric traction drives.

In one embodiment a processor-implemented method for torsional damping of an electric traction driveline is provided, the method comprising: operating a first filter to perform a first state space estimation of a shaft torque; operating a second filter to perform a second state space estimation of a load torque; and providing torsional damping of the electric traction driveline based upon the first state space estimation of the shaft torque and the second state space estimation of the load torque.

In another embodiment a system for torsional damping of an electric traction driveline is provided, the system comprising: a processor; and a memory storing computer readable instructions that, when executed by the processor, implement: a first filter configured to perform a first state space estimation of a shaft torque; a second filter configured to perform a second state space estimation of a load torque; and a damper configured to provide torsional damping of the electric traction driveline based upon the first state space estimation of the shaft torque and the second state space estimation of the load torque.

In another embodiment, a computer readable storage device including a computer program for torsional damping of an electric traction driveline is provided, the computer program including instructions for: operating a first filter to perform a first state space estimation of a shaft torque; operating a second filter to perform a second state space estimation of a load torque; and providing torsional damping of the electric traction driveline based upon the first state space estimation of the shaft torque and the second state space estimation of the load torque.

BRIEF DESCRIPTION OF THE DRAWINGS

Various objects, features and advantages of the present disclosure will become apparent to one skilled in the art, in view of the following detailed description taken in combination with the attached drawings, in which.

DETAILED DESCRIPTION

For the purpose of describing and claiming the present invention, the term "motoring" is intended to refer to the condition in which a motor is receiving electrical power as an input and is providing torque as an output.

For the purpose of describing and claiming the present invention, the term "regeneration" (or "generate" or "generating") is intended to refer to the condition in which a motor is receiving torque as an input and is providing electrical power as an output.

For the purpose of describing and claiming the present invention, the term "driveline" is intended to refer to a motor, a load and a shaft connecting the motor and the load (along with the associated axel(s), bearing(s), universal joint(s) and gear(s)).

For the purpose of describing and claiming the present invention, the term "baseline damping" is intended to refer to traditional torsional damping based on the derivative of angular velocity (as read by a speed sensor) as well as knowledge of system inertia.

For the purpose of describing and claiming the present invention, the following notation will be used:

$\omega_l$ Load Speed (RPS) [sometimes identified herein as "OmegaL"]

T* Torque Command (Nm)

$T_{sh}$ Shaft Torque (Nm)

$\omega_m$ Motor Speed (RPS) [sometimes identified herein as "OmegaM"]

$J_m$ Motor Inertia (Kgm^2)

$J_l$ Load Inertia (Kgm^2)

$T_l$ Load Torque (Nm)

$K_{sh}$ Shaft Spring Rate (Nm/Rad)

$B_m$ Motor Friction (Nm/RPS)

$B_l$ Load Friction (Nm/RPS)

$G_{psr}$ Planetary Speed Reduction Ratio $G_{diff}$ Differential Ratio $b(\Delta\theta)$ Backlash Function A, B, C, D Continuous State Space Matrices $A_d$, $B_d$, $C_d$, $D_d$ Discrete State Space Matrices $\omega_0$ Resonance $\omega_a$ Anti-Resonance I Identity Matrix T Discrete Sample Time Vehicle components, such as the driveline have "dangerous" natural resonances and/or frequencies that will, over time, cause component failure. Removing these dangerous natural resonances, e.g., torsional oscillations, can greatly improve the life of the vehicle components. Two filters, such as Kalman filters, can be used to identify and remove torsional oscillations in both internal and external disturbances.

With respect to the above, torsional damping goals may include the elimination (or attenuation) of torsional oscillations of the driveline (e.g., oscillations occurring at the resonant frequency of the driveline). Such oscillations can be induced through commanded torque and external disturbances. In various examples, the following events must be addressed: anti-lock brake system ("ABS"); road bumps; limit operation; commanded torque; zero speed; and/or backlash.

Figure 1A:
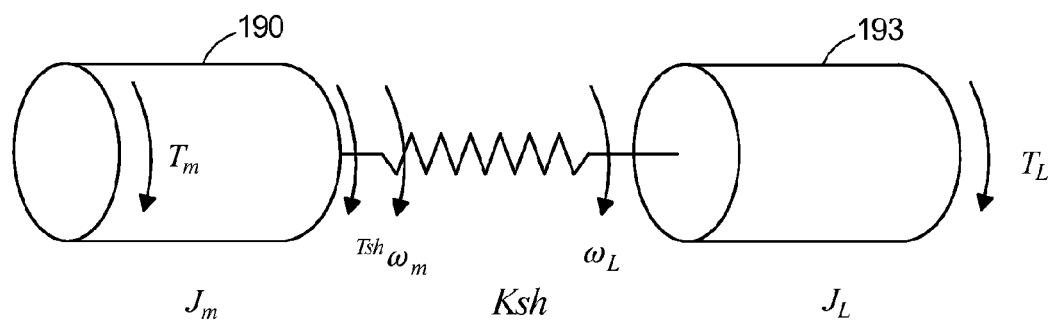
FIG. 1A illustrates a two-mass driveline dynamic model according to an aspect of the present disclosure.

Referring now to FIG. 1A, illustrated is a two-mass driveline dynamic model (including motor 190 and load 193) according to an aspect of the present disclosure.

In connection with this two-mass driveline dynamic model of FIG. 1A, the following equations apply:

Resonance $\hspace{4cm}$ Equation (1)

$$\omega_0 = \sqrt{K_{sh}\left(\frac{1}{J_m} + \frac{1}{J_l}\right)}$$

Antiresonance $\hspace{3.5cm}$ Equation (2)

$$\omega_a = \sqrt{K_{sh}\frac{1}{J_l}}$$

$$\dot{\omega}_m = \frac{T^* - \frac{T_{sh}}{G_{psr}} - B_m\omega_m}{J_m} \hspace{2cm} \text{Equation (3)}$$

$$\dot{\omega}_l = \frac{G_{diff}T_{sh} - T_l - B_l\omega_l}{J_l} \hspace{2cm} \text{Equation (4)}$$

$$G_{psr}\dot{\theta}_m - G_{diff}\dot{\theta}_l = G_{psr}\omega_m - G_{diff}\omega_l \hspace{1cm} \text{Equation (5)}$$

$$T_{sh} = K_{sh}b(G_{psr}\theta_m - G_{diff}\theta_l) + B_{sh}(G_{psr}\omega_m - G_{diff}\omega_l) \hspace{0.5cm} \text{Equation (6)}$$

Figure 1B:
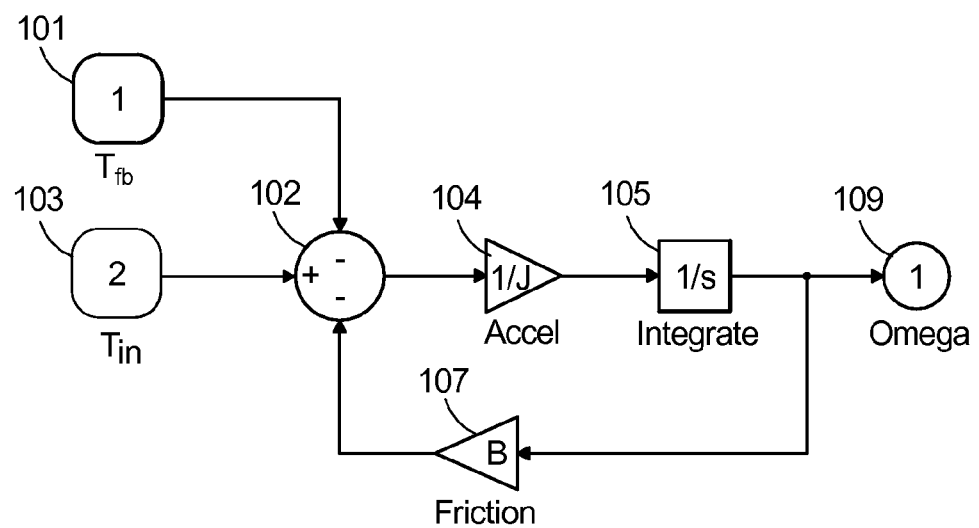
FIG. 1B illustrates a block diagram implementation associated with the two-mass driveline dynamic model of FIG. 1A.

Referring now to FIG. 1B, a block diagram implementation associated with the two-mass driveline dynamic model of FIG. 1A is illustrated (this figure illustrates a block diagram model of a single mass in the associated two-mass driveline dynamic model). As seen in this FIG. 1B, Tfb (feedback torque) 101 and the output from element 107 (Friction) are subtracted from Tin (input torque) 103 at element 102 (Summing Block). The value from element 102 is provided to element 104 (Acceleration) and this output is then integrated at element 105 (Integrator). The value from element 105 is fed back to block 107 (Friction) and also output as Omega 109.

Still referring to FIG. 1B, Tfb represents the feedback (load) torque and Tin is the input torque. When a net torque (Tin−Tfb) is applied to a rotating mass (with mass moment of inertia J) an angular acceleration (alpha—which is the derivative of omega) is produced according to (Tin−Tfb)/J=alpha. The friction term b represents a force generated from gears, bearings, and windage which opposes or resists the motion of the rotating mass.

Figure 1C:
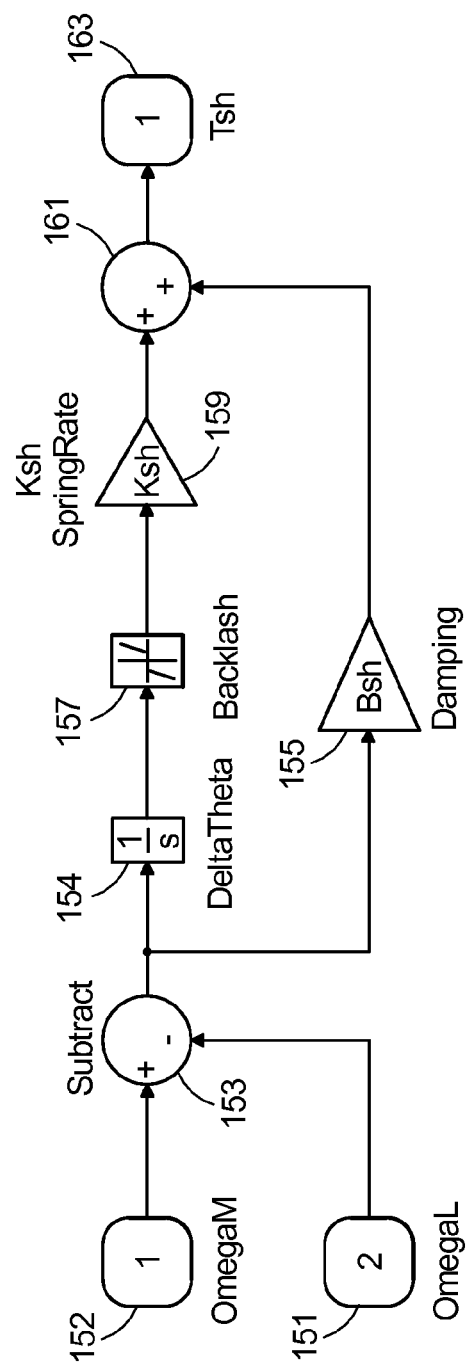
FIG. 1C illustrates a block diagram implementation associated with the two-mass driveline dynamic model of FIG. 1A.

Referring now to FIG. 1C, another block diagram implementation associated with the two-mass driveline dynamic model of FIG. 1A is illustrated (this figure illustrates the driveline as a rotational spring that includes backlash and damping). As seen in this FIG. 1C, OmegaL 151 is subtracted from OmegaM 152 at the element 153 (Summing Block). The value from the element 153 is provided to element 154 (Delta Theta) as well as element 155 (Damping). The output from element 154 is provided to element 157 (Backlash) and the output from element 157 is provided to 159 (Spring Rate). Further, the output from element 159 and element 155 are summed at element 161 (Summing Block). Element 161 then outputs Shaft Torque 163.

Still referring to FIG. 1C, delta theta represents the difference in angular position between the input and output of the drive line. Damping (Bsh) refers to frictional losses inherent in the driveline which tend to dampen the oscillation of the shaft. Backlash refers to the phenomenon of lost motion between parts (gears/joints); this produces a non-linearity in the system as torque traverses zero. The spring rate (Ksh) is a constant that depends on the material and construction of the driveline; it represents the force per unit displacement that a spring will produce in order to return to equilibrium.

Figure 2:
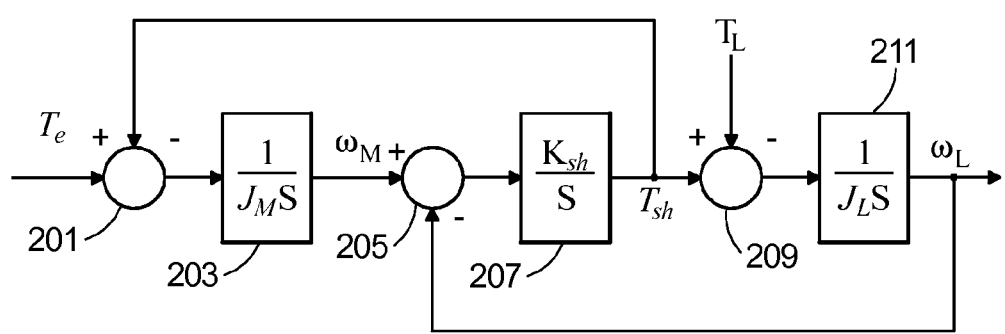
FIG. 2 illustrates a simplified driveline dynamic model according to an aspect of the present disclosure.

Referring now to FIG. 2, illustrated is simplified driveline dynamic model according to an aspect of the present disclosure. In connection with this FIG. 2, it is noted that by reflecting all parameters to the motor planetary speed reducer and differential, ratios can be simplified to 1 (in order to control driveline oscillations friction and damping will be ignored here as they are small and have minimal effect). Further, in connection with this FIG. 2, the following equations apply (Te is equivalent to T*):

$$\dot{\omega}_m = \frac{T^* - T_{sh}}{J_m} \quad \text{Equation (7)}$$

$$\dot{\omega}_l = \frac{T_{sh} - T_l}{J_l} \quad \text{Equation (8)}$$

$$\dot{T}_{sh} = K_{sh}(\omega_m - \omega_l) \quad \text{Equation (9)}$$

Still referring to FIG. 2, it is seen that Tsh is fed back and subtracted from Te, at element 201 (Summing Block). The value from element 201 is provided to element 203 (Division Block) and this output (which is OmegaM) is applied to element 205 (Summing Block). At element 205, OmegaL is subtracted from OmegaM and the output is applied to element 207 (Division Block). The output from element 207, which is Tsh, is applied along with $T_L$ to element 209 (Summing Block). As mentioned above, Tsh is also fed back to element 201. The output from element 209 is applied to element 211 (Division Block), which outputs OmegaL.

Reference will now be made to a simplified driveline dynamic model-state space. In this regard, a simplified model may be represented in state space wherein the equations are arranged to determine A, B, C and D matrices. In connection with this simplified model, the following equations apply:

$$\dot{\omega}_m = \frac{T^* - T_{sh}}{J_m} \quad \text{Equation (10)}$$

$$\dot{\omega}_l = \frac{T_{sh} - T_l}{J_l} \quad \text{Equation (11)}$$

$$\dot{T}_{sh} = K_{sh}(\omega_m - \omega_l) \quad \text{Equation (12)}$$

$$\dot{T}_l = 0 \quad \text{Equation (13)}$$

$$\dot{x} = Ax + Bu \quad \text{Equations (14) and (15)}$$
$$y = Cx + Du$$

Matrices:

$$x = \begin{bmatrix} \omega_m \\ \omega_l \\ T_{sh} \\ T_l \end{bmatrix}$$

$$A = \begin{bmatrix} 0 & 0 & -1/J_m & 0 \\ 0 & 0 & 1/J_l & -1/J_l \\ K_{sh} & -K_{sh} & 0 & 0 \\ 0 & 0 & 0 & 0 \end{bmatrix}$$

$$B = \begin{bmatrix} 1/J_m \\ 0 \\ 0 \\ 0 \end{bmatrix}$$

$$u = T^*$$
$$C = [1 \ 0 \ 0 \ 0]$$
$$D = 0$$

Reference will now be made to a discrete time-state space. In this regard, in order to model the driveline in software the system must be converted to discrete time (in this example, with sample rate 0.002). In connection with this discrete time-state space, the following equations apply:

$$\dot{x} = Ax + Bu \quad \longrightarrow \quad x_{k+1} = A_d x_k + B_d u_k \quad \text{Equations (16) and (17)}$$
$$y = Cx + Du \quad\quad\quad\quad y_k = C_d x_k + D_d u_k$$

$$A \quad\quad A_d = e^{AT} \quad \text{Equation (17)}$$

$$B \xrightarrow{ZOH} B_d = \int_0^T e^{A(kT+t-\tau)} B \, d\tau$$

$$C \quad\quad C_d = C$$

$$D \quad\quad D_d = D$$

[Taylor Series Expansion]  Equation (18)

$$e^{AT} = I + TA + \frac{T^2}{2!}A^2 + \ldots$$

$$\int_0^T e^{A(kT+T-\tau)} B \, d\tau =$$

$$\left( TI + \frac{T^2}{2!}A + \frac{T^3}{3!}A^2 + \ldots \right) B$$

Reference will now be made to a parameter estimation. In connection with one specific example of such parameter estimation, the following apply (backlash and damping can be extracted measuring theta during zero speed torque reversals):

$$J_m = 0.8 \text{ kgm}^2 \quad - \text{Motor} \quad \text{Equation (19)}$$

$$J_{driveline} = 0.2 \text{ kgm}^2 \quad - \text{Lumped Sum Drive shaft,} \quad \text{Equation (20)}$$
gears, differential, brakes, tires all reflected to motor $$J_l = J_{driveline} + \frac{Mr^2}{G_{psr}^2 + G_{diff}^2} - \quad \text{Equation (21)}$$

Total load inertia consists of vehicle weight reflected to motor and all driveline components $$M = 32500 \text{ lbs} * 0.454 \frac{\text{kg}}{\text{lb}} \quad - \text{Average vehicle weight} \quad \text{Equation (22)}$$

$$r = 0.5174 \text{ m} \quad - \text{Tire radius} \quad \text{Equation (23)}$$

$$G_{psr} = 4.024 \quad \text{Equation (24)}$$

$$G_{diff} = 4.33 \quad \text{Equation (25)}$$

$$K_{sh} = \frac{\omega_0}{\frac{1}{J_m} + \frac{1}{J_l}} = 365 \frac{\text{Nm}}{\text{rad}} \quad \text{Equation (26)}$$

$$\omega_0 = 3.5 * 2\pi RPS \quad \text{Equation (27)}$$

Figure 3:
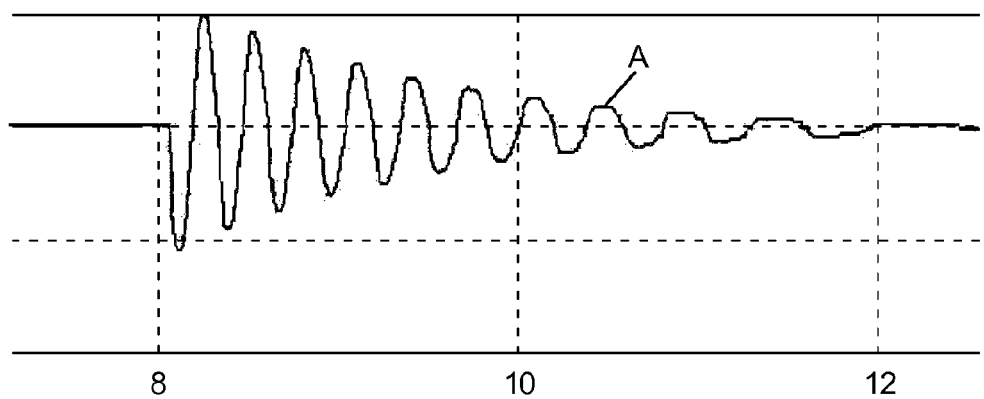
FIG. 3 illustrates a graph associated with an example parameter estimation according to an aspect of the present disclosure.

Referring now to FIG. 3, illustrated is a graph associated with an example parameter estimation (showing resonance determined from neutral drop) according to an aspect of the present disclosure. The test used to produce this graph involves introducing full torque into the driveline with the wheels locked. The torque is instantaneously removed from the input in order to excite the driveline at its resonant frequency. The plot illustrates motor speed vs time and the frequency of the observed oscillation is the resonant frequency of the driveline.

Reference will now be made to a Kalman filter state observer. In connection with one specific example of such a Kalman filter state observer, it is noted that a Kalman filter can be constructed for the simplified state space model by assuming there exists zero mean white Gaussian noise in the process (w) and in the measurement (v) with covariance matrices Q and R. Further, in connection with such a Kalman filter state observer, the following equations apply:

$$x_{k+1} = A_d x_k + B_d u_k + w$$

$$y_k = C_d x_k + D_d u_k + V \quad \text{Equations (28) and (29)}$$

$$R = \sigma_v^2 \quad \text{Equation (30)}$$

$$Q = \sigma_w^2 I \quad \text{Equation (31)}$$

$$K_k = P_k C^T (C P_k C^T + R)^{-1} \quad (32) \text{ [Compute Kalman Gain]}$$

$$\text{resid} = \text{meas} - C^* x_k \quad \text{Equation (33)}$$

Equation (34) [Use measurement to compute error and update state]

$$P_k = (I - K_k C) P_k \quad \text{Equation (35) [Compute error covariance matrix]}$$

$$x_{k+1} = A_d x_k + B_d u_k \quad \text{Equation (36)}$$

$$P_{k+1} = A_d P_k A_d^T + Q \quad \text{Equation (37) [Project ahead]}$$

Figure 4:
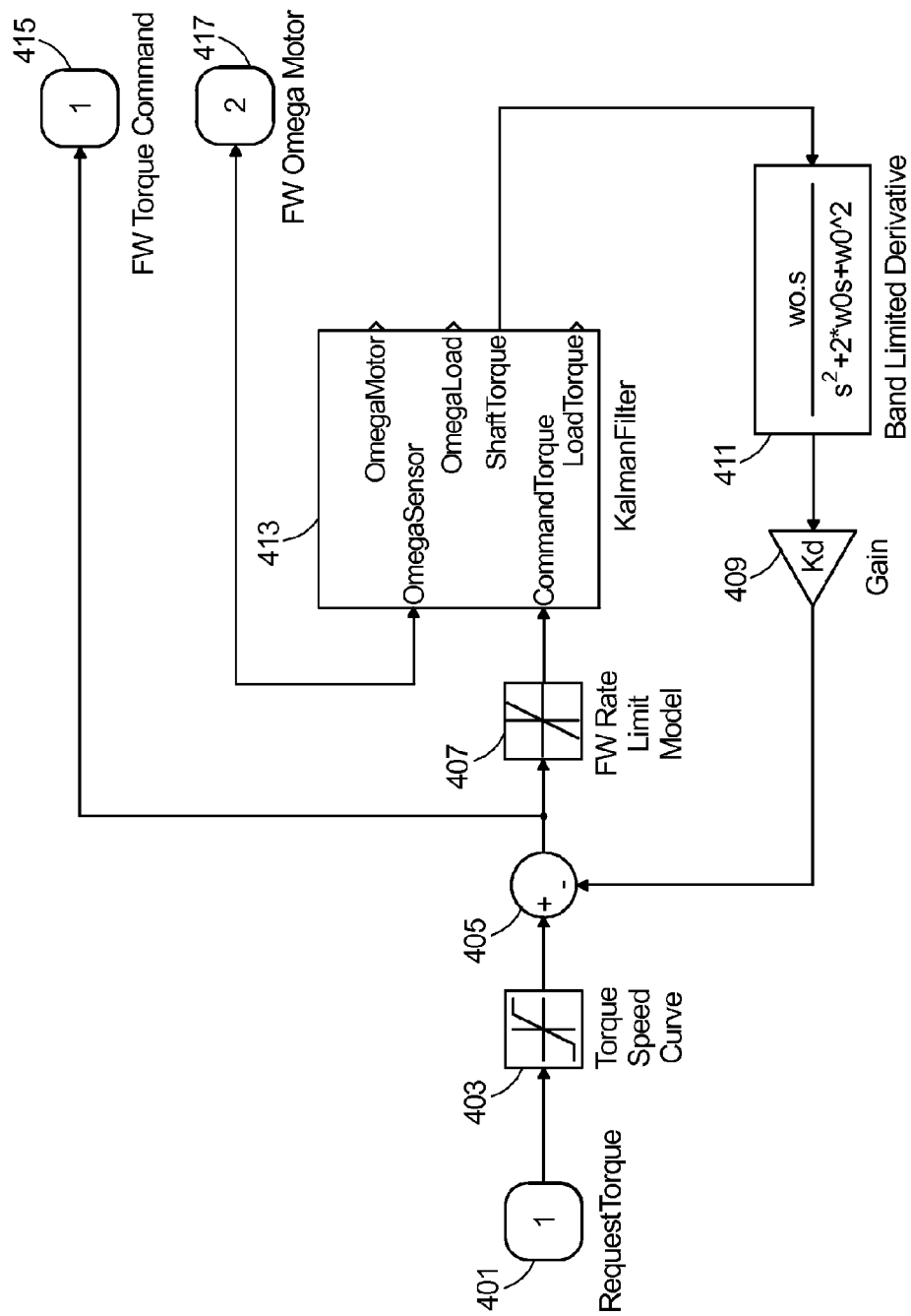
FIG. 4 illustrates a block diagram implementation of a Kalman filter applied to torque damping control according to an aspect of the present disclosure.

Referring now to FIG. 4, illustrated is a block diagram implementation of a Kalman filter applied to torque damping control according to an aspect of the present disclosure (the dynamic content of the state space estimation of shaft torque produced by the Kalman filter produces a torque damping signal that will prevent drive line oscillations). As seen in this FIG. 4, Request Torque at 401 is applied to element 403 (Torque Speed Curve—this is a torque vs speed limitation of the motor or motor drive which must be observed by the controller). The output from element 403 is applied to element 405 (Summing Block) along with the output from element 409 (Gain). The output from element 405 is provided as FW Torque Command (this represents the torque command that the system controller transmits to the field oriented controller (inverter controller)) at 415 as well as to element 407 (FW Rate Limit Model—this represents a torque rate limit which must replicate any torque rate limiting introduced by the field oriented controller (inverter controller) in order to accurately estimate the torque generated by motor). The output from element 407 is provided to a Command Torque input of Kalman Filter 413. In addition, FW Omega Motor (this is the rotational speed of the motor as reported by the field oriented controller (inverter controller) as read by the motor's speed sensor) at 417 is provided to an Omega Sensor input of Kalman Filter 413. Moreover, the output from a Shaft Torque output of Kalman Filter 413 is provided to element 411 (Band Limited Derivative) and the output from element 411 is in turn provided to element 409 (Gain).

Figure 5:
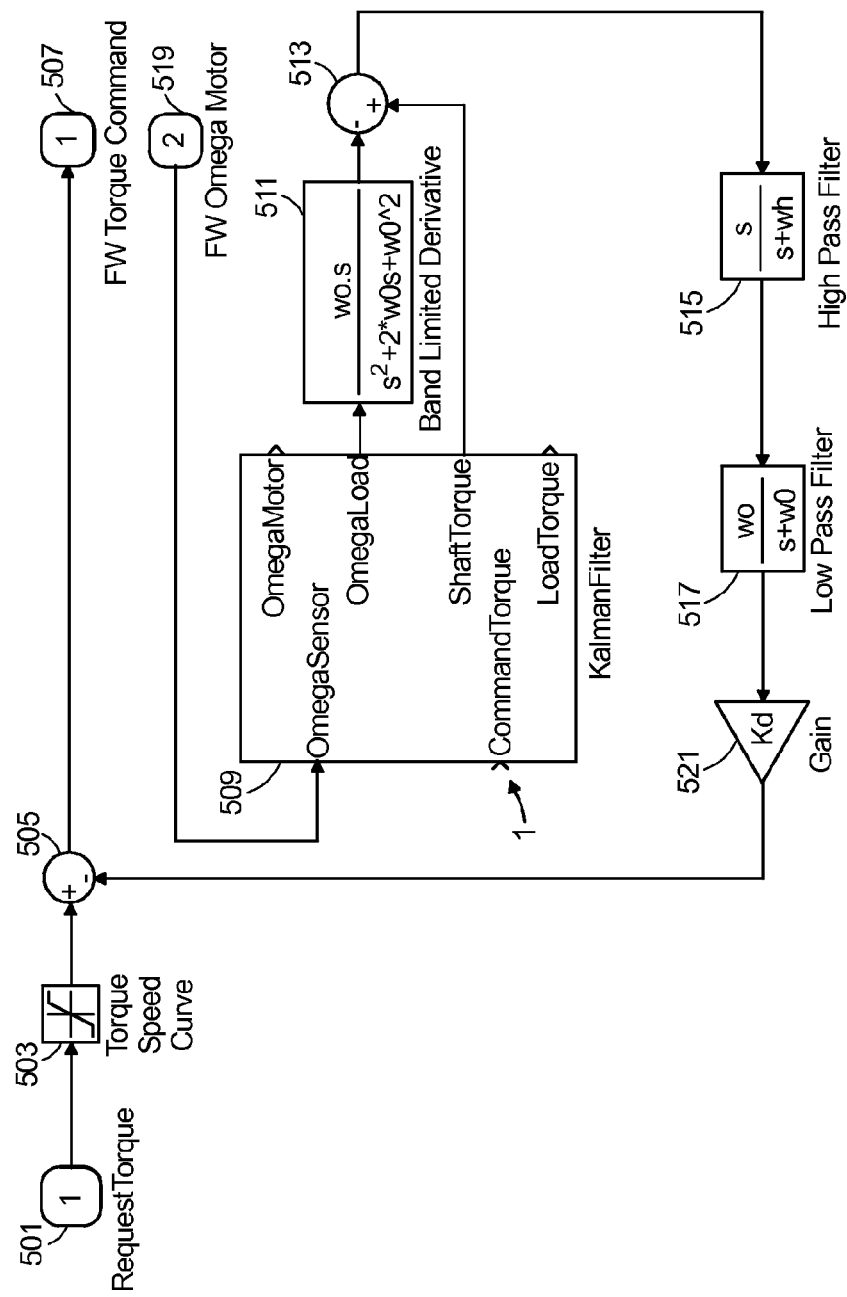
FIG. 5 illustrates a block diagram implementation of a Kalman filter applied to load acceleration control according to an aspect of the present disclosure.

Referring now to FIG. 5, illustrated is a block diagram implementation of a Kalman filter applied to load acceleration control according to an aspect of the present disclosure (when the wheel speed deviates from vehicle speed (e.g., ABS, wheel slip, road bumps) a sudden load acceleration occurs which must be limited in order to prevent the driveline from oscillating). As seen in this FIG. 5, Request Torque at 501 is applied to element 503 (Torque Speed Curve—this is a torque vs speed limitation of the motor or motor drive which must be observed by the controller). The output from element 503 is applied to element 505 (Summing Block) along with the output from element 519 (Gain). The output from element 505 is provided as FW Torque Command (this represents the torque command that the system controller transmits to the field oriented controller (inverter controller)) at 507. In addition, FW Omega Motor (this is the rotational speed of the motor as reported by the field oriented controller (inverter controller) as read by the motor's speed sensor) at 519 is provided to an Omega Sensor input of Kalman Filter 509. Further, the output from an Omega Load output of Kalman Filter 509 is provided to element 511 (Band Limited Derivative). The output of element 511, along with an output from a Shaft Torque output of Kalman Filter 509 are provided to element 513 (Summing Block). The output from element 513 (which is Load Torque) is provided to element 515 (High Pass Filter). The output from element 515 is provided to element 517 (Low Pass Filter) and the output from element 517 is provided to element 521 (Gain).

Still referring to FIG. 5, it is noted that ignoring Torque Command (see arrow 1), eliminates requested dynamics from load acceleration estimate.

Figure 6:
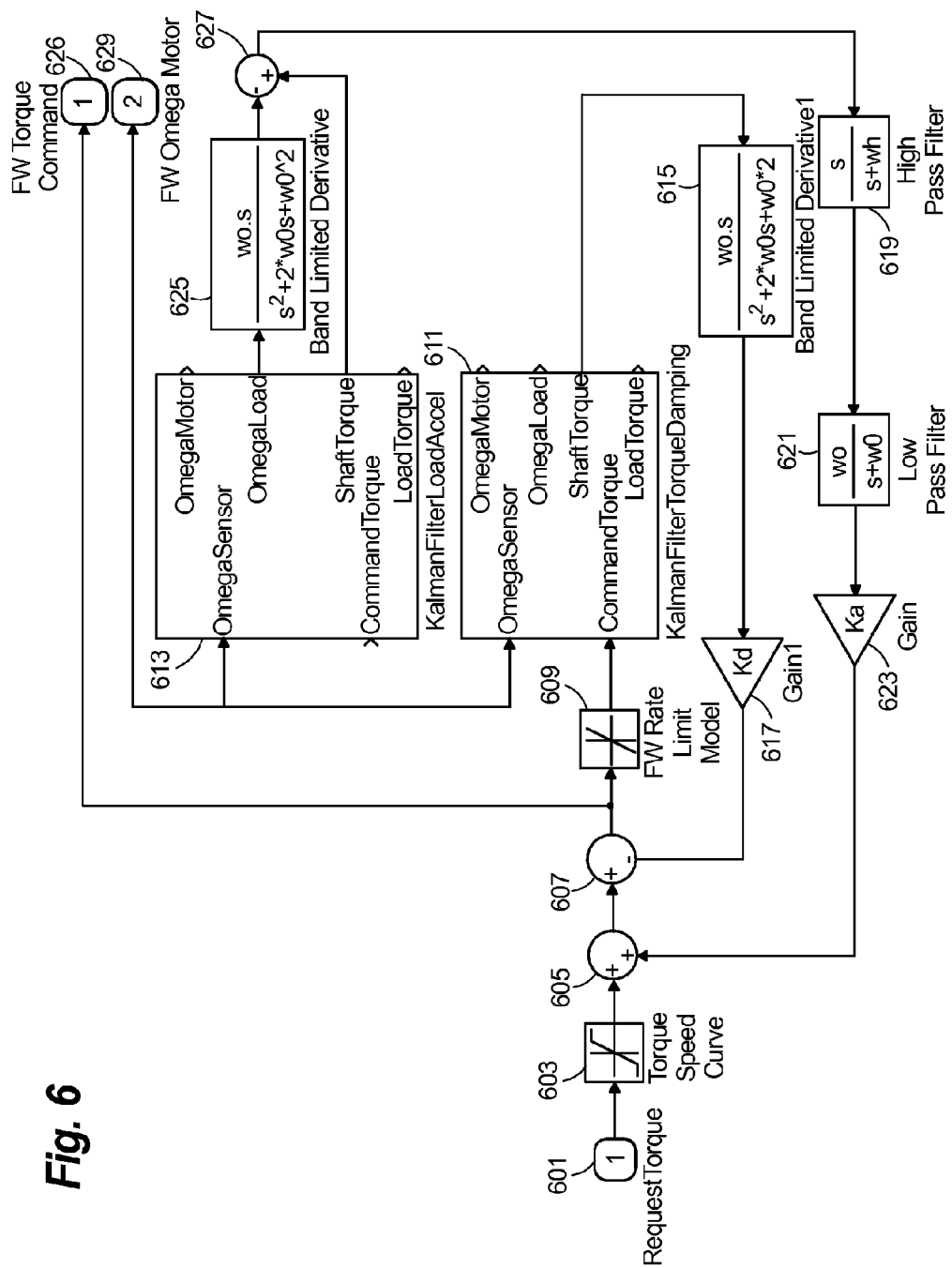
FIG. 6 illustrates a block diagram implementation of a combined driveline damping control strategy (using two Kalman filters) according to an aspect of the present disclosure.

Referring now to FIG. 6, illustrated is a block diagram implementation of a combined driveline damping control strategy (using two Kalman filters) according to an aspect of the present disclosure (this combined implementation utilizes aspects of the implementation of FIG. 4 and aspects of the implementation of FIG. 5).

As seen in this FIG. 6, Request Torque at 601 is applied to element 603 (Torque Speed Curve—this is a torque vs speed limitation of the motor or motor drive which must be observed by the controller). The output from element 603 is applied to element 605 (Summing Block) along with the output from element 623 (Gain). The output from element 605 is applied to element 607 (Summing Block) along with the output from element 617 (Gain). The output from element 607 is provided as FW Torque Command (this represents the torque command that the system controller transmits to the field oriented controller (inverter controller)) at 626 as well as to element 609 (FW Rate Limit Model—this represents a torque rate limit which must replicate any torque rate limiting introduced by the field oriented controller (inverter controller) in order to accurately estimate the torque generated by motor).

Still referring to FIG. 6, it is seen that the output from element 609 is provided to a Command Torque input of Kalman Filter (Torque Damping) 611. In addition, FW Omega Motor (this is the rotational speed of the motor as reported by the field oriented controller (inverter controller) as read by the motor's speed sensor) at 629 is provided to an Omega Sensor input of Kalman Filter (Torque Damping) 611 as well as to an Omega Sensor input of Kalman Filter (Load Acceleration) 613.

Still referring to FIG. 6, it is seen that the output from an Omega Load output of Kalman Filter (Load Acceleration) 613 is provided to element 625 (Band Limited Derivative). An output from element 625 is provided to element 627 (Summing Block) along with an output from a Shaft Torque output of Kalman Filter (Load Acceleration) 613. In addition, the output from element 627 is provided to element 619 (High Pass Filter). The output from element 619 is provided to element 621 (Low Pass Filter) and the output from element 621 is provided to element 623 (Gain). Moreover, an output from a Shaft Torque output of Kalman Filter (Torque Damping) 611 is provided to element 615 (Band Limited Derivative) and the output from element 615 is in turn provided to element 617 (Gain).

Figure 7A:
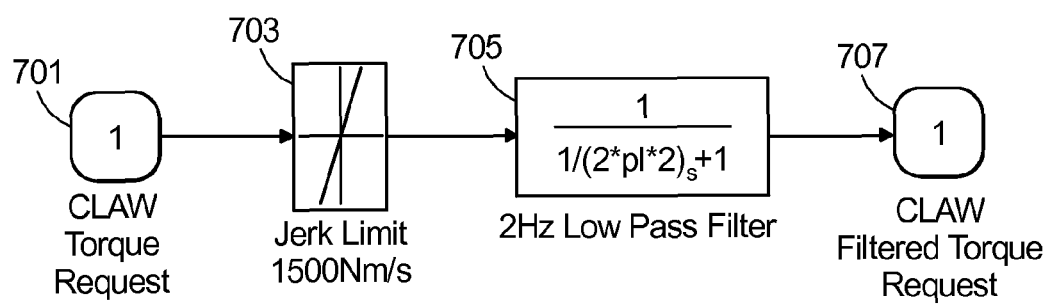
FIG. 7A illustrates a block diagram implementation associated with Command Path Dynamic Reduction according to an aspect of the present disclosure.

Referring now to FIG. 7A, illustrated is a block diagram implementation associated with Command Path Dynamic Reduction according to an aspect of the present disclosure. This figure illustrates preconditioning of the system controller's torque command. The Control Law (CLAW) torque request is the torque the system controller requests based on driver inputs and current conditions of the vehicle. Jerk Limits (also known as acceleration limits) are applied as well as low pass filtering in order to remove any sudden step impulses from the system level controller's torque command into the inverter controller and ultimately the driveline. The CLAW (Control Law) filtered torque request is the torque command presented to the dual Kalman torsional damper and ultimately the inverter controller. More particularly, as seen in this figure, CLAW Torque Request at 701 is provided to element 703 (Jerk Limit). In one specific example, the Jerk Limit is 1500 Nm/s. The output from element 703 is provided to element 705 (Low Pass Filter). In one specific example, the Low Pass Filter is a 2 Hz Low Pass Filter. Moreover, the output from element 705 is provided at 707 as CLAW Filtered Torque Request.

Figure 7B:
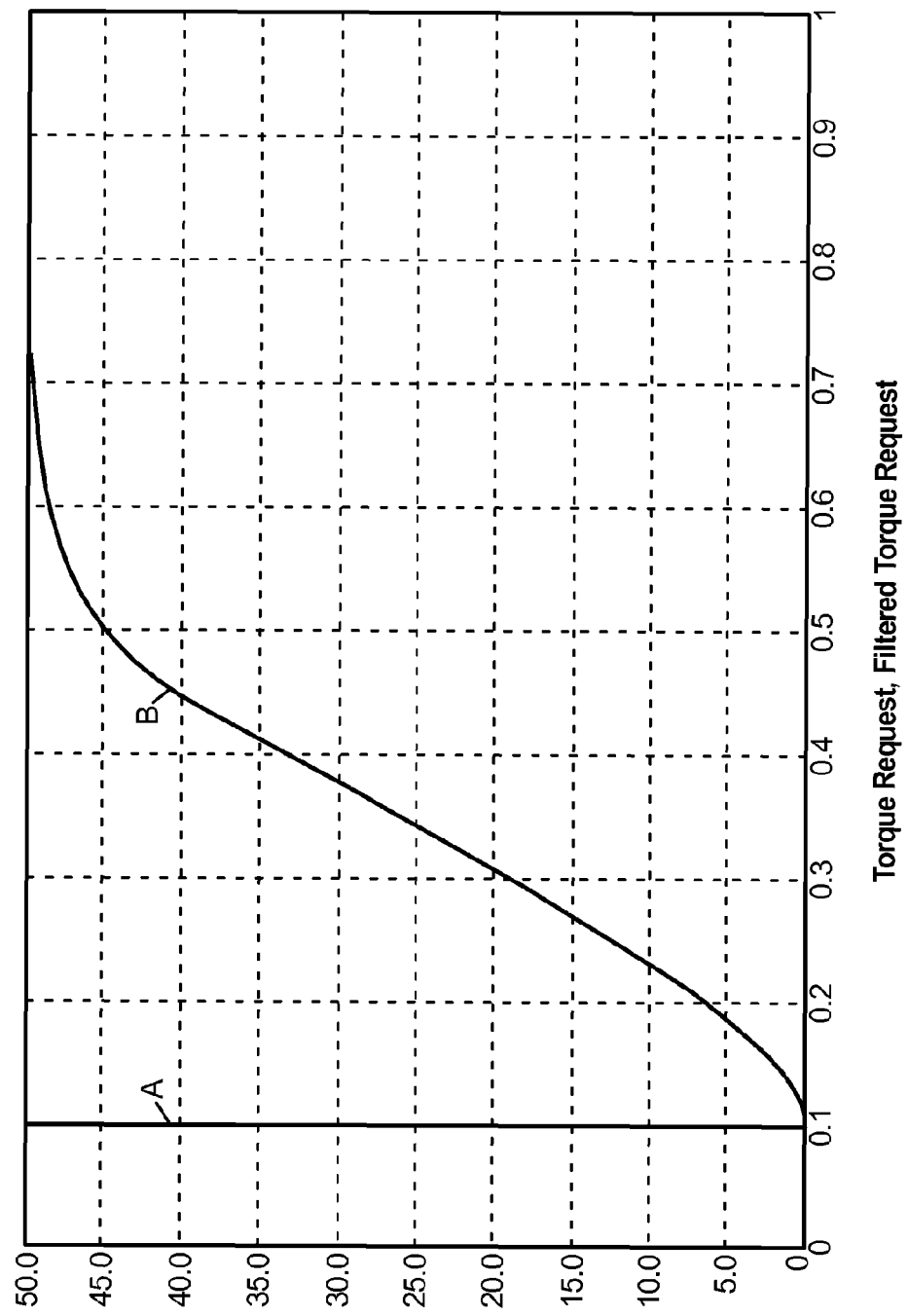
FIG. 7B illustrates a graph associated with the Command Path Dynamic Reduction of FIG. 7 according to an aspect of the present disclosure.

FIG. 7B illustrates a graph associated with the CLAW (Command Path Dynamic Reduction) according to an aspect of the present disclosure. In this FIG. 7B, trace "A" is Torque Request (see 701 of FIG. 7A) and trace "B" is Filtered Torque Request (see 707 of FIG. 7A).

Still referring to FIGS. 7A and 7B, it is noted that: (i) command path dynamics must not be allowed to excite driveline; (ii) only limited reduction in filtering and jerk limits can be applied before pedal latency is observed; and (iii) improved driveline damping control will selectively remove remaining resonant component of command.

Figure 8A:
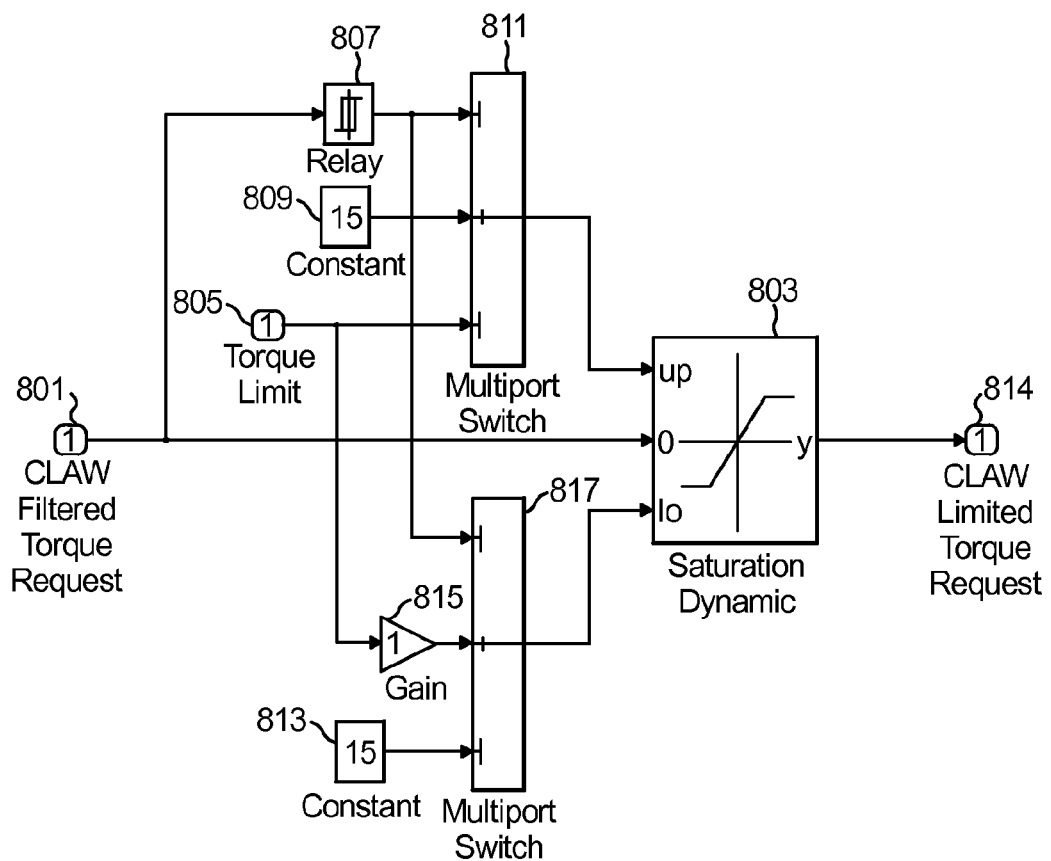
FIG. 8A illustrates a block diagram implementation associated with Backlash Keepout according to an aspect of the present disclosure.

Referring now to FIG. 8A, illustrated is a block diagram implementation associated with Backlash Keepout according to an aspect of the present disclosure. In this figure, the saturation dynamic limiter produces an output y as a limited value of input u given the upper bound up and lower bound lo. This block introduces a deadband in the torque command around zero in order to prevent operation at zero torque which will result in rattling from backlash. More particularly, as seen in this figure, Filtered Torque Request at 801 (see also 707 of FIG. 7A) is provided to element 807 (Relay) as well as to input "u" of element 803 (Saturation Dynamic). An output from element 807 is provided to an input of multiport switch 811 as well as to an input of multiport switch 817. Further, an output of element 809 (Constant) is provided to a second input of multiport switch 811. Further still, Torque Limit at element 805 is provided to a third input of multiport switch 811 as well as to element 815 (Gain). An output of element 815 is provided to a second input of multiport switch 817. Moreover, an output of element 813 (Constant) is provided to a third input of multiport switch 817. An output of multiport switch 811 is provided to input "up" of element 803 (Saturation Dynamic) and output of multiport switch 817 is provided to input "lo" of element 803 (Saturation Dynamic). From output "y" of element 803 (Saturation Dynamic) a Limited Torque Request is provided at 814.

Figure 8B:
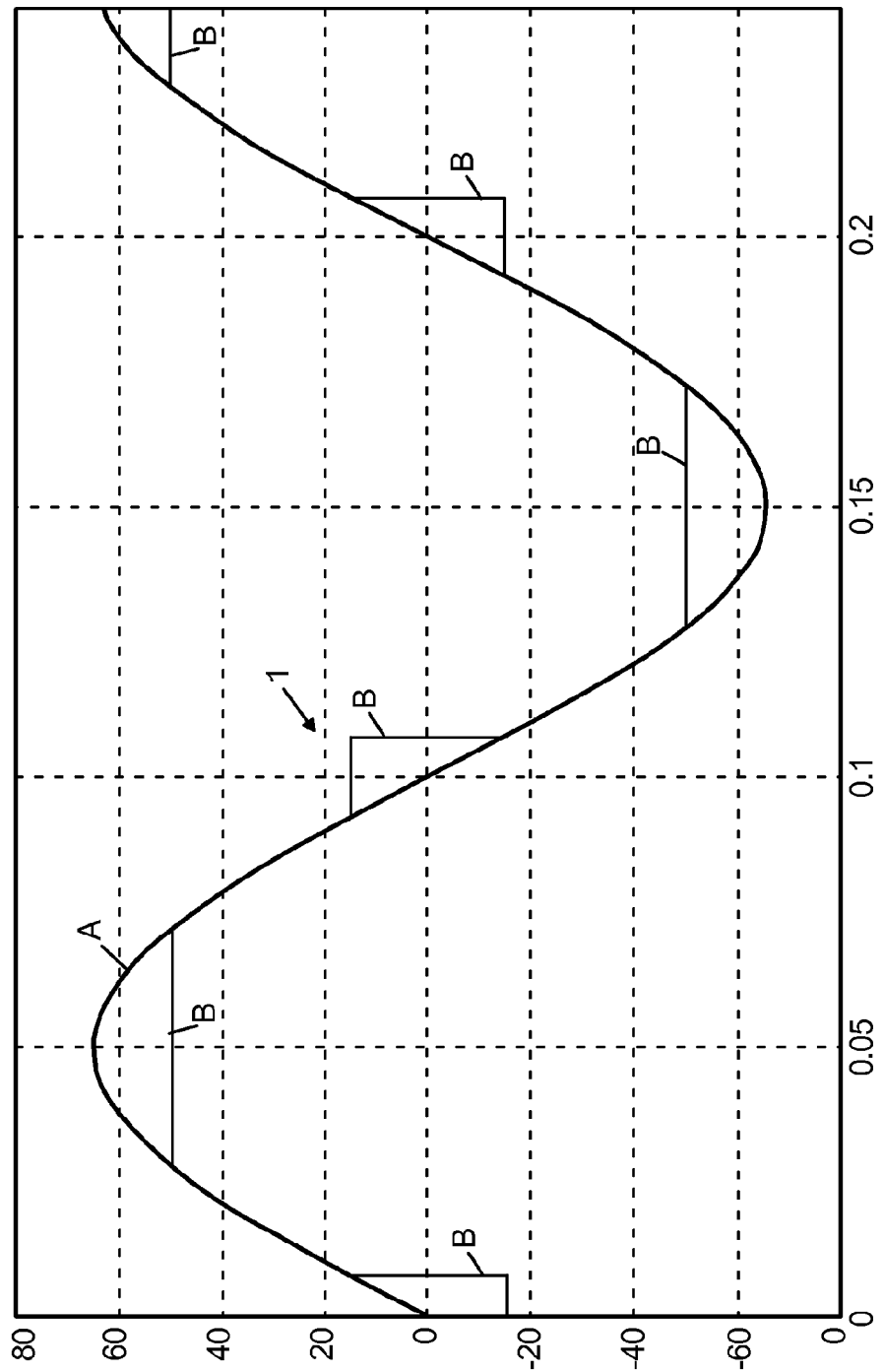
FIG. 8B illustrates a graph associated with the Backlash Keepout of FIG. 8A according to an aspect of the present disclosure.

FIG. 8B illustrates a graph associated with the Updates (Backlash Keepout) according to an aspect of the present disclosure. In this FIG. 8B, trace "A" is Torque Request (see 801 of FIG. 8A) and trace "B" is Limited Torque (see 815 of FIG. 8A). Further, traces "A" and "B" are similar to each other, except where trace 'B" deviates as shown. Further still, as shown at arrow 1, for example, torque cannot be commanded in backlash.

Still referring to FIGS. 8A and 8B, it is noted that: (i) torque limits are applied before damping; and (ii) hysteresis band minimizes backlash crossings.

Figure 9:
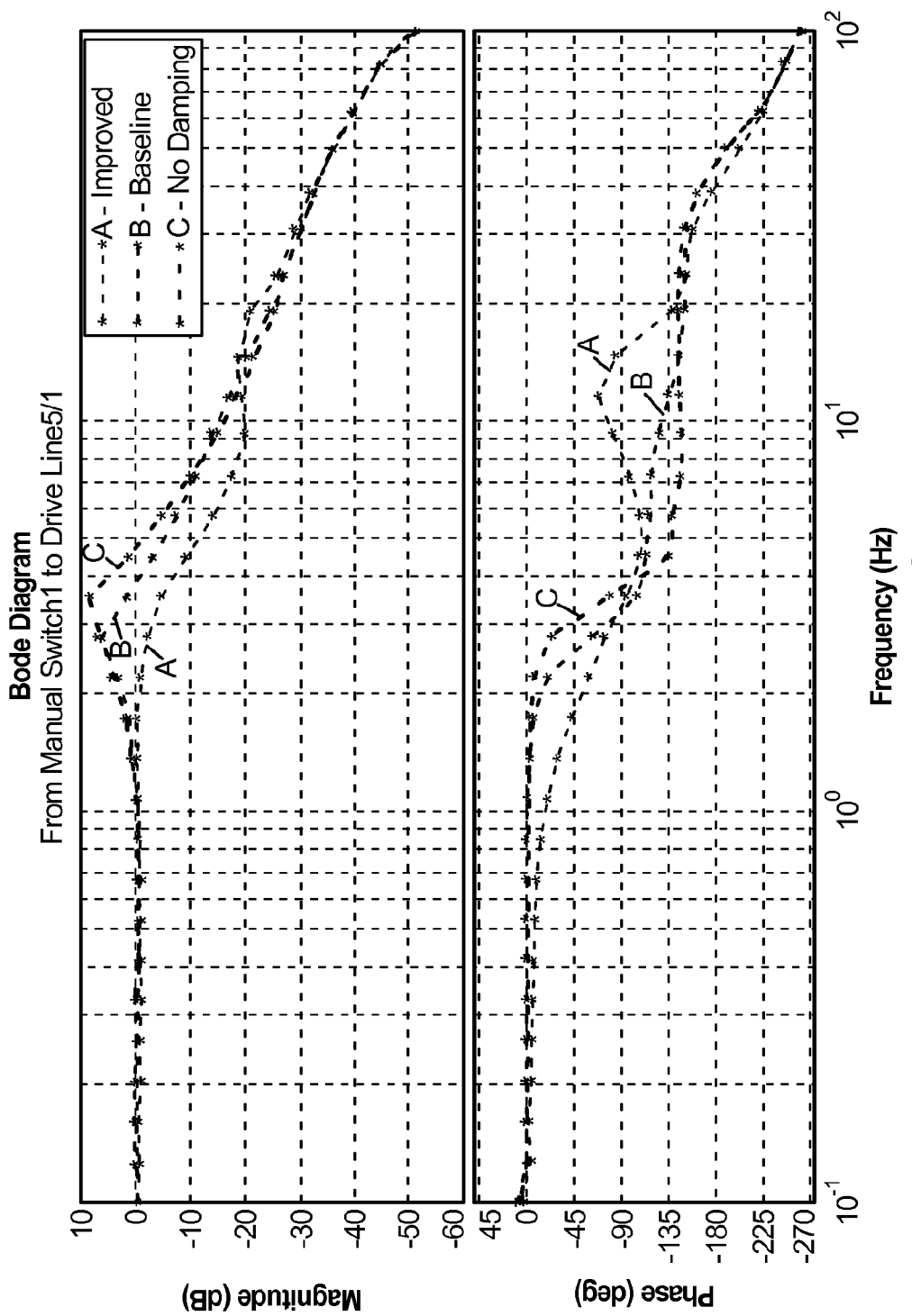
FIG. 9 illustrates a Bode diagram associated with command to shaft torque closed loop response according to an aspect of the present disclosure.

Referring now to FIG. 9, this figure illustrates a Bode diagram associated with command to shaft torque closed loop response according to an aspect of the present disclosure (in this FIG. 9, the trace labeled "A" is for the improved system according to an aspect of the present disclosure; the trace labeled "B" is for a baseline; and the trace labeled "C" is for no damping).

Figure 10:
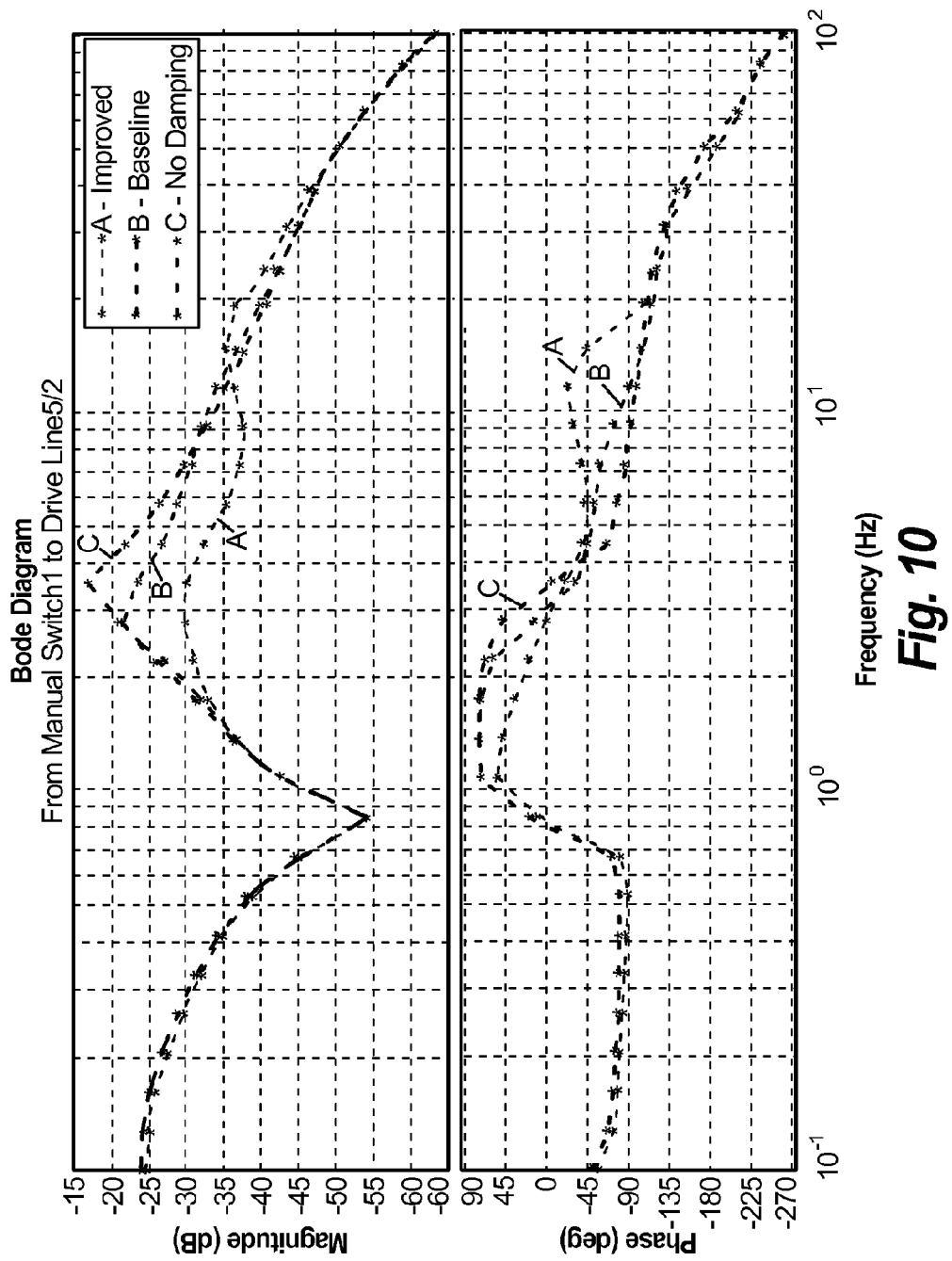
FIG. 10 illustrates a Bode diagram associated with command to motor speed closed loop response according to an aspect of the present disclosure.

Referring now to FIG. 10, this figure illustrates a Bode diagram associated with command to motor speed closed loop response according to an aspect of the present disclosure (in this FIG. 10, the trace labeled "A" is for the improved system according to an aspect of the present disclosure; the trace labeled "B" is for a baseline; and the trace labeled "C" is for no damping).

Figure 11:
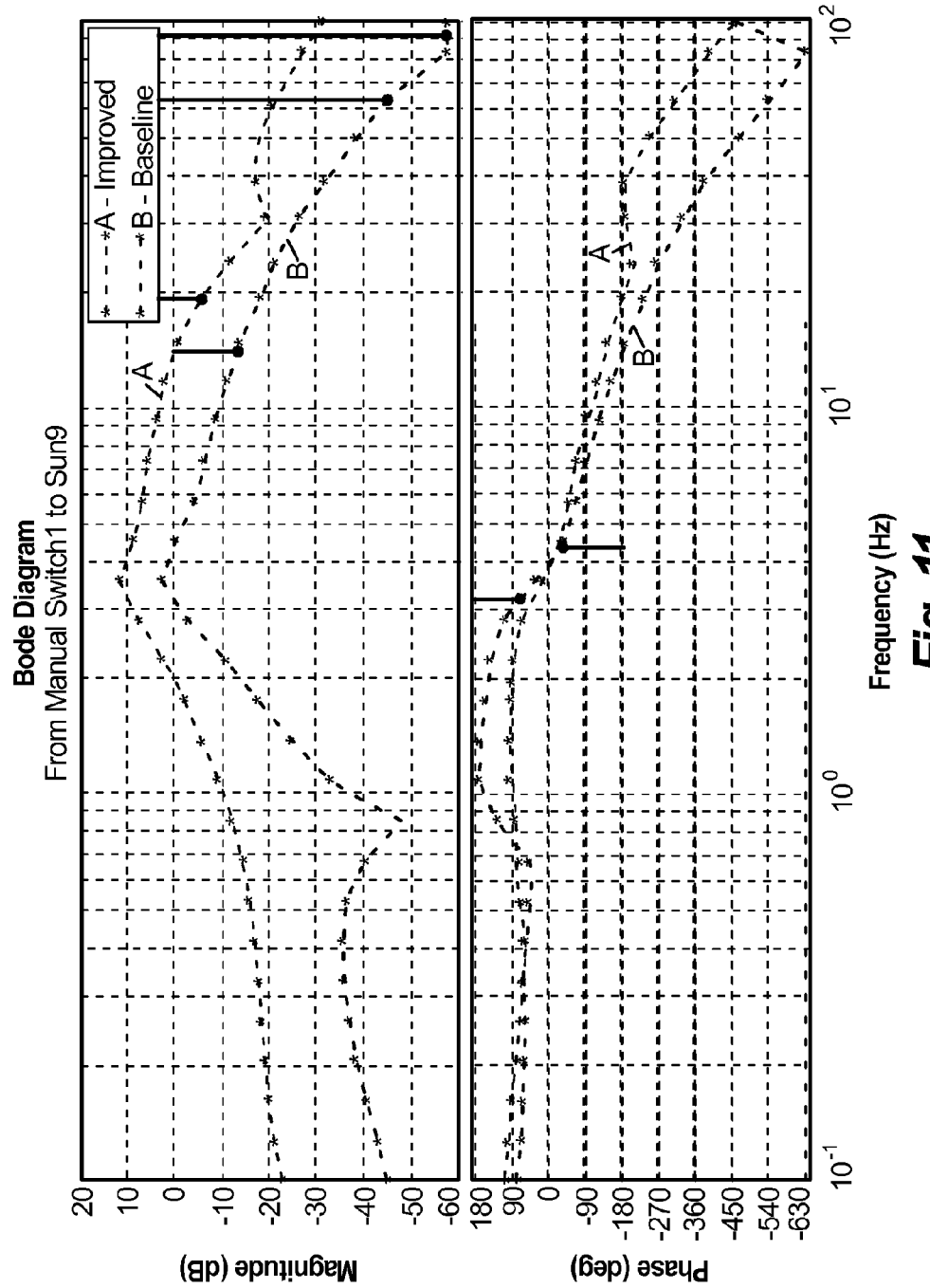
FIG. 11 illustrates a Bode diagram associated with driveline damping open loop response according to an aspect of the present disclosure (as seen, the improved system according to an aspect of the present disclosure is stable with 6 db Gain Margin and 45 Deg Phase Margin)

Referring now to FIG. 11, this figure illustrates a Bode diagram associated with driveline damping open loop response according to an aspect of the present disclosure (in this FIG. 11, the trace labeled "A" is for the improved system according to an aspect of the present disclosure; the trace labeled "B" is for a baseline). As seen, the improved system according to an aspect of the present disclosure is stable with 6 db Gain Margin and 45 Deg Phase Margin (that is, in this example, the control system has 6 decibels of margin in its gain before it becomes unstable and the control system has 45 degrees of margin in its phase response before it becomes unstable.

Figure 12:
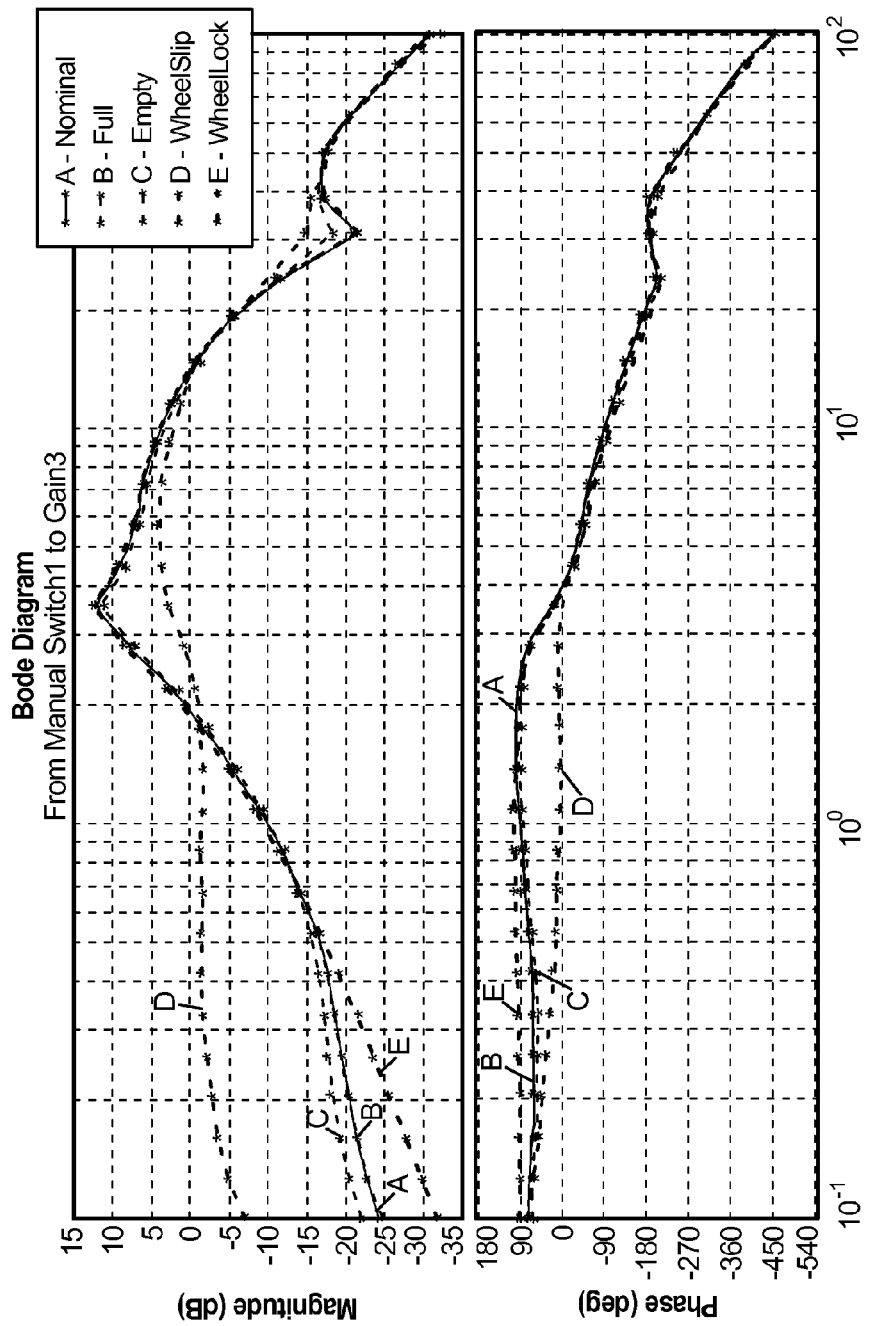
FIG. 12 illustrates a Bode diagram associated with driveline damping open loop loading sensitivity according to an aspect of the present disclosure (as seen, the improved system according to an aspect of the present disclosure (that is, in the context of a vehicle driveline being controlled with dual Kalman torsional damping) has stability maintained under various loading/traction)

Referring now to FIG. 12, this figure illustrates a Bode diagram associated with driveline damping open loop loading sensitivity according to an aspect of the present disclosure (in this FIG. 12, the trace labeled "A" is for Nominal; the trace labeled "B" is for a Full; the trace labeled "C" is for Empty; the trace labeled "D" is for Wheel Slip; and the trace labeled "E" is for Wheel Lock). As seen, the improved system according to an aspect of the present disclosure has stability maintained under various loading/traction).

Figure 13:
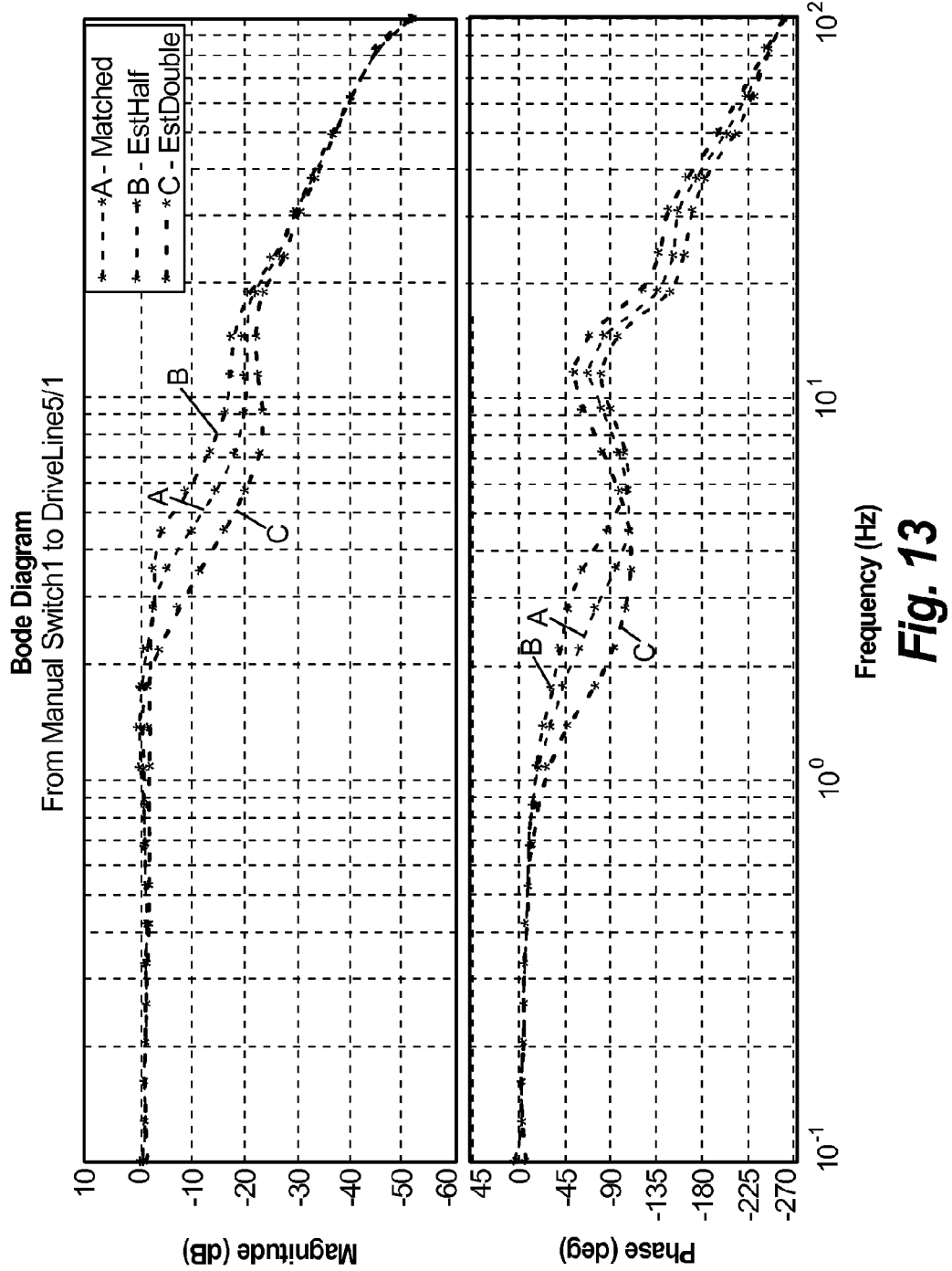
FIG. 13 illustrates a Bode diagram associated with command torque stiffness sensitivity according to an aspect of the present disclosure (as seen, stiffness error causes phase shift to deviate from 90 deg at resonance)

Referring now to FIG. 13, this figure illustrates a Bode diagram associated with command torque stiffness sensitivity according to an aspect of the present disclosure. As seen, stiffness error causes phase shift to deviate from 90 deg at resonance (this figure illustrates the sensitivity of the controller to errors in the estimated driveline stiffness; that is, this figure shows that even significant errors in the estimated stiffness produce a stable system (though performance may be reduced)). In this FIG. 13, the trace labeled "A" is for Matched; the trace labeled "B" is for a EstHalf (Estimated Half); the trace labeled "C" is for EstDouble (Estimated Double). That is, this plot compares the response of the controller to errors in the estimated value of the drive shaft stiffness showing frequency responses when the estimated value is correct, half of the system's and double the system's.

Figure 14A:
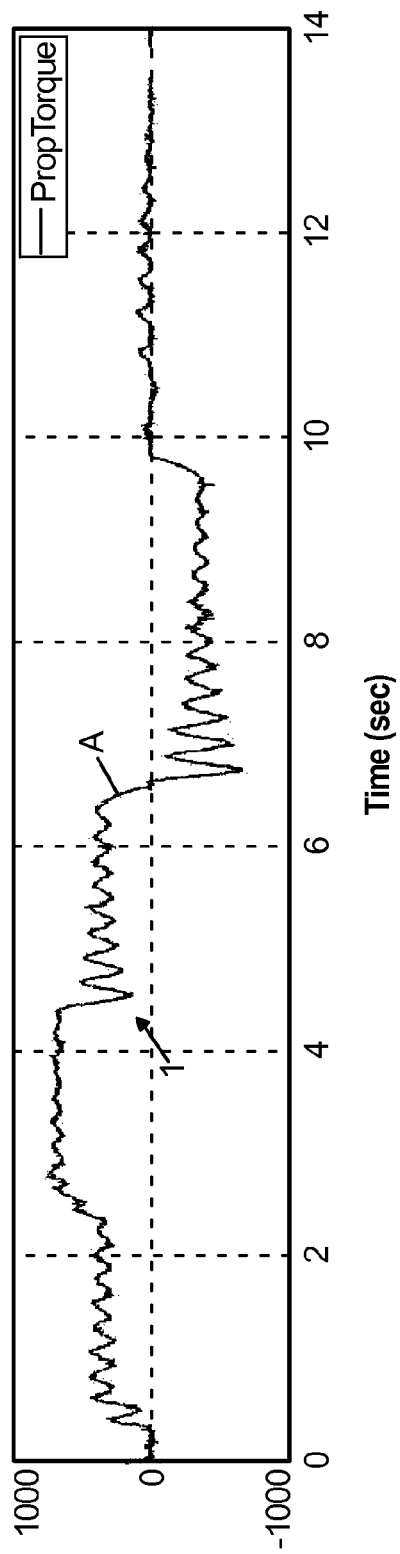
FIG. 14A illustrates a graph associated with command-torque steps (in which there is no torque damping)

Referring now to FIG. 14A, this figure illustrates a graph associated with command-torque steps (in which there is no torque damping). In this FIG. 14A, the trace "A" is Shaft Torque (or "Prop Torque"). As seen at arrow 1, driveline resonance leads to significant ringing.

Figure 14B:
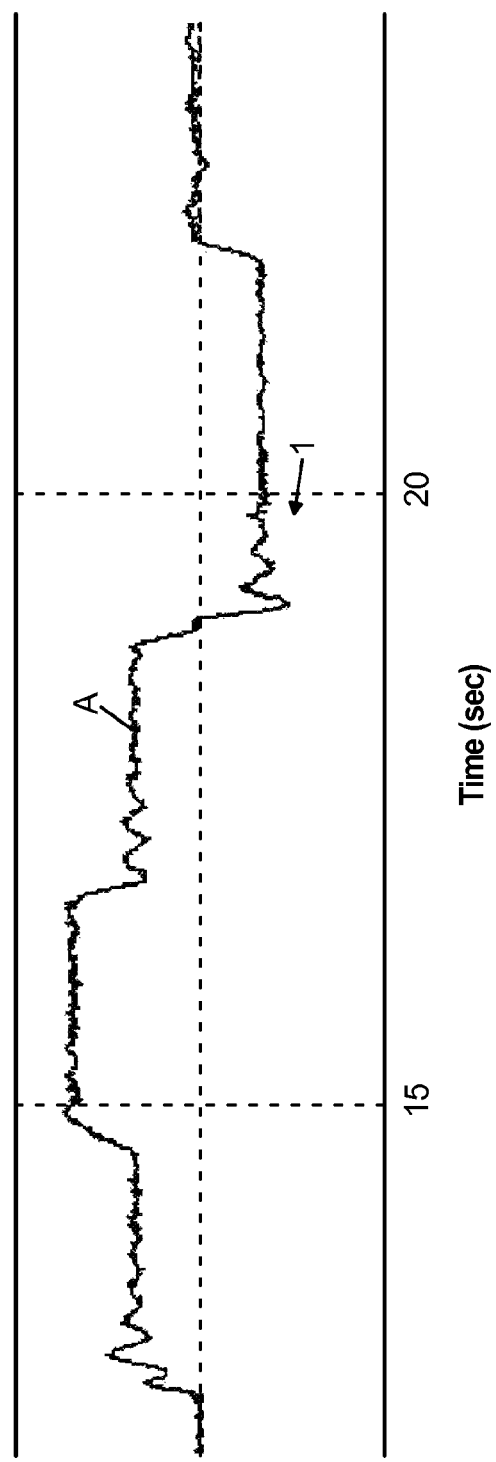
FIG. 14B illustrates a graph associated with command-torque steps (in which there is baseline damping)

Referring now to FIG. 14B, this figure illustrates a graph associated with command-torque steps (in which there is baseline damping). In this FIG. 14B, the trace "A" is Shaft Torque (or "Prop Torque"). As seen at arrow 1, baseline damping continues to ring.

Figure 14C:
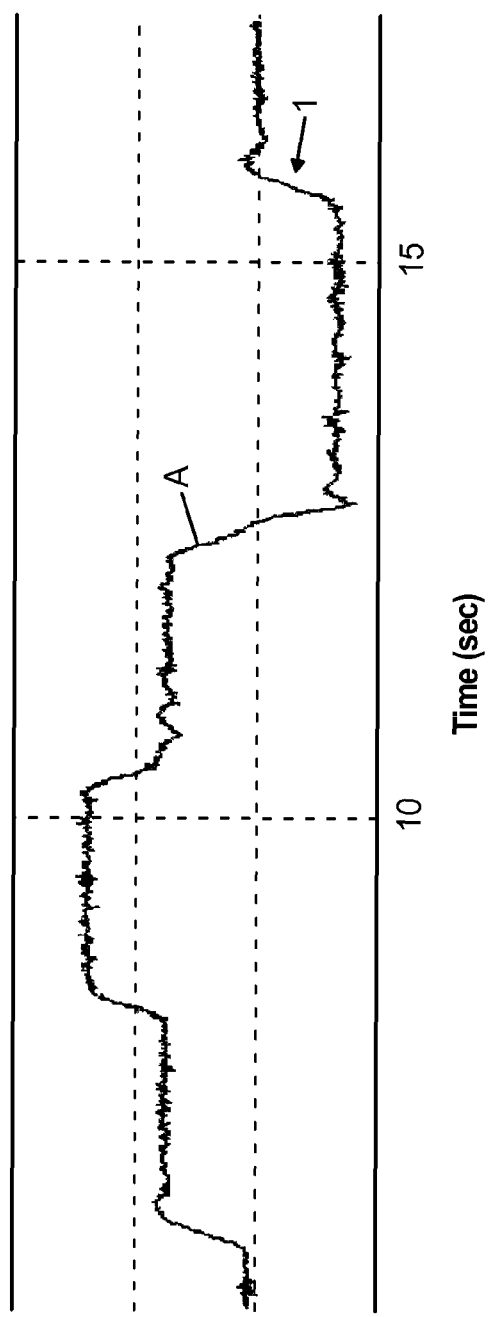
FIG. 14C illustrates a graph associated with command-torque steps (in which there is improved torque damping according to an aspect of the present disclosure)

Referring now to FIG. 14C, this figure illustrates a graph associated with command-torque steps (in which there is improved torque damping according to an aspect of the present disclosure). In this FIG. 14C, the trace "A" is Shaft Torque (or "Prop Torque"). As seen at arrow 1, ringing is eliminated and only a small overshoot exists.

Figure 15A:
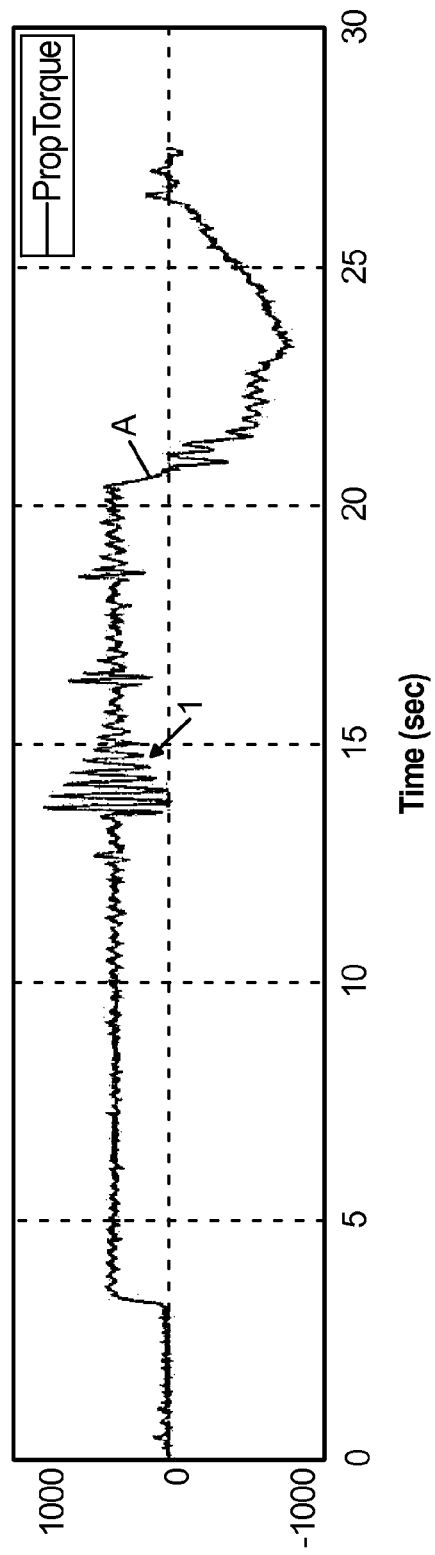
FIG. 15A illustrates a graph associated with road bump (in which there is baseline torque damping)

Referring now to FIG. 15A, this figure illustrates a graph associated with road bump (in which there is baseline torque damping). In this FIG. 15A, the trace "A" is (or "Prop Torque"). As seen at arrow 1, bumps create slowly damped oscillation.

Figure 15B:
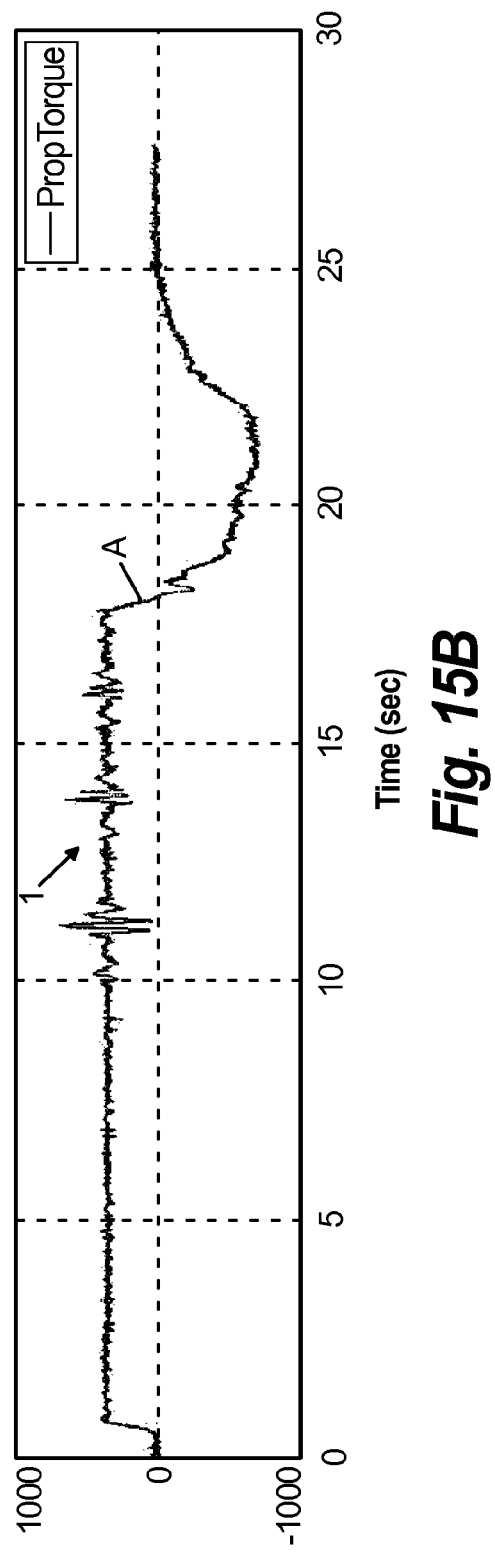
FIG. 15B illustrates a graph associated with road bump (in which there is improved driveline damping according to an aspect of the present disclosure)

Referring now to FIG. 15B, this figure illustrates a graph associated with road bump (in which there is improved driveline damping according to an aspect of the present disclosure). In this FIG. 15B, the trace "A" is Shaft Torque (or "Prop Torque"). As seen at arrow 1, there has been attenuated ripple, with ringing eliminated.

Figure 16A:
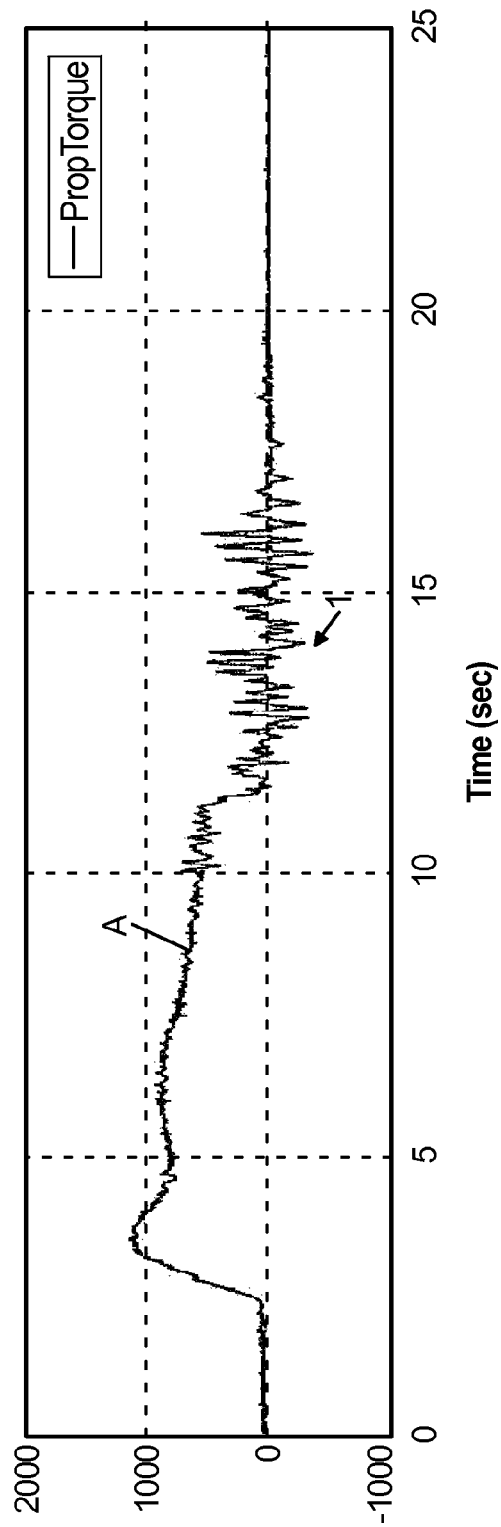
FIG. 16A illustrates a graph associated with anti-lock breaking, or "ABS" (in which there is baseline damping)

Referring now to FIG. 16A, this figure illustrates a graph associated with anti-lock breaking, or "ABS" (in which there is baseline damping). In this FIG. 16A, the trace "A" is Shaft Torque (or "Prop Torque"). As seen at arrow 1, baseline ABS event contains sustained zero crossings.

Figure 16B:
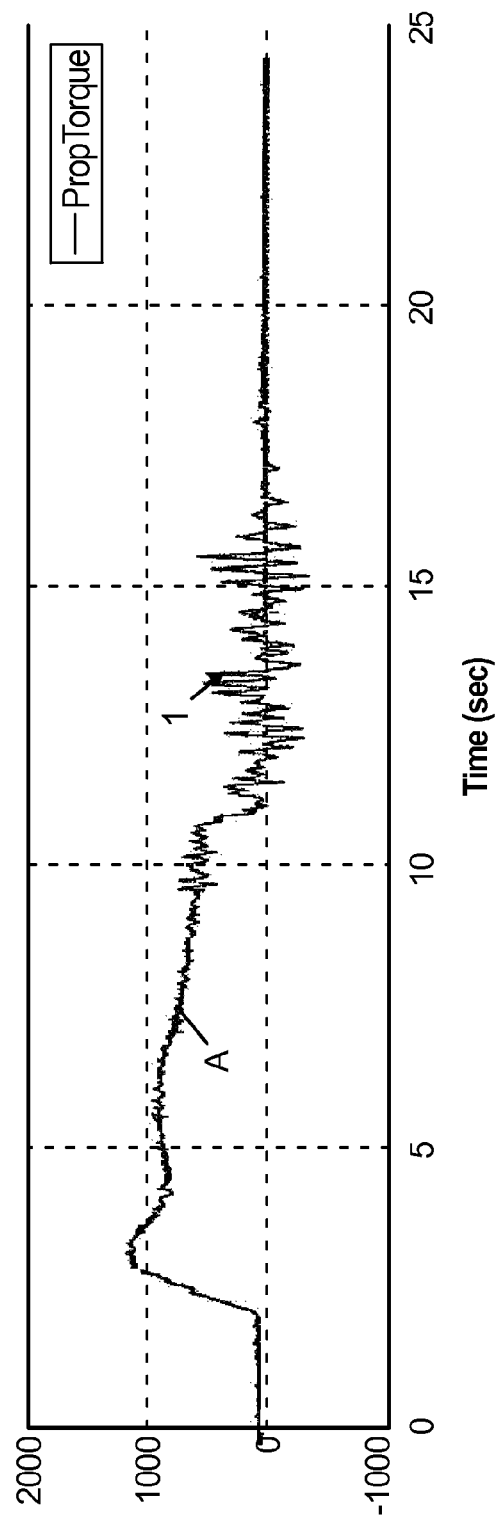
FIG. 16B illustrates a graph associated with ABS (in which there is improved driveline damping according to an aspect of the present disclosure)

Referring now to FIG. 16B, this figure illustrates a graph associated with ABS (in which there is improved driveline damping according to an aspect of the present disclosure). In this FIG. 16B, the trace "A" is Shaft Torque (or "Prop Torque"). As seen at arrow 1, there has been reduced zero crossings and attenuated ripple.

Figure 17A:
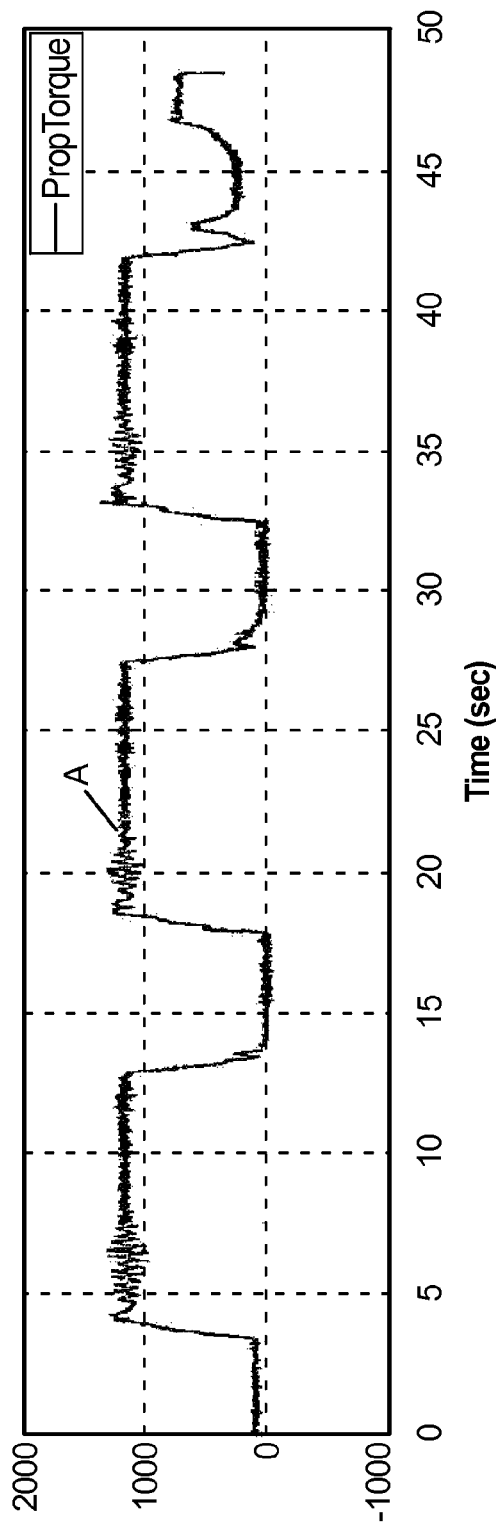
FIG. 17A illustrates a graph associated with hill starting (in which there is baseline damping)

Referring now to FIG. 17A, this figure illustrates a graph associated with hill starting (in which there is baseline damping). In this FIG. 17A, the trace "A" is Shaft Torque (or "Prop Torque").

Figure 17B:
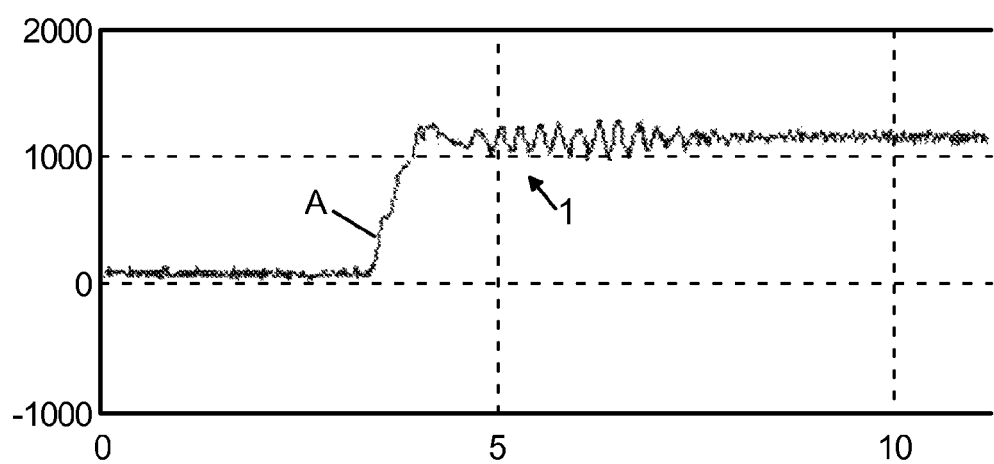
FIG. 17B illustrates certain details of the graph of FIG. 17A.

Referring now to FIG. 17B, this figure illustrates certain details of the graph of FIG. 17A. In this FIG. 17B, the trace "A" is Shaft Torque (or "Prop Torque").

Figure 18A:
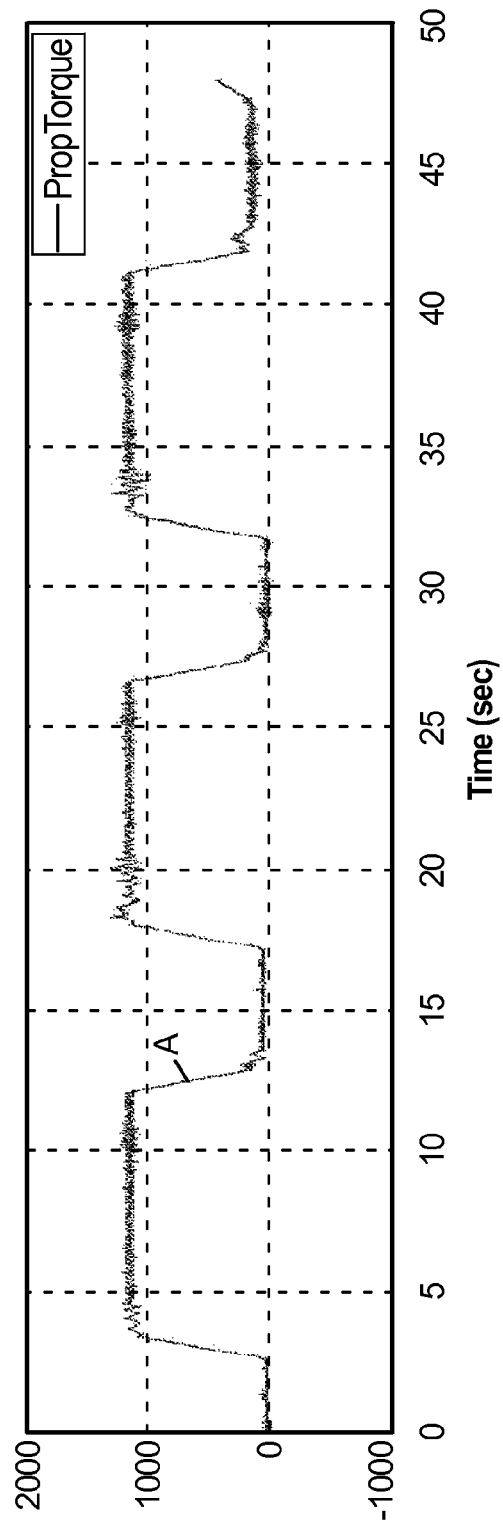
FIG. 18A illustrates a graph associated with hill starting (in which there is improved driveline damping according to an aspect of the present disclosure)

Referring now to FIG. 18A, this figure illustrates a graph associated with hill starting (in which there is improved driveline damping according to an aspect of the present disclosure). In this FIG. 18A, the trace "A" is Shaft Torque (or "Prop Torque").

Figure 18B:
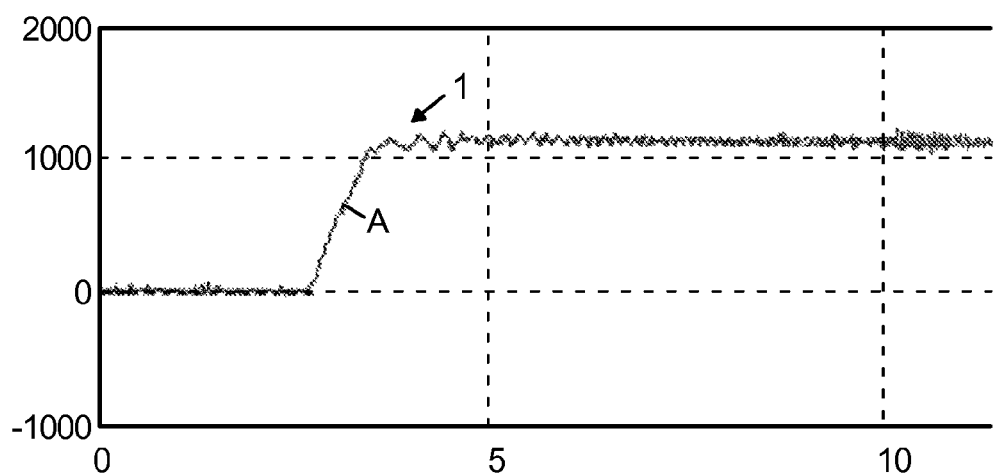
FIG. 18B illustrates certain details of the graph of FIG. 18A.

Referring now to FIG. 18B, this figure illustrates certain details of the graph of FIG. 18A. In this FIG. 18B, the trace "A" is Shaft Torque (or "Prop Torque"). As seen at arrow 1 of this figure (compared with arrow 1 of FIG. 17B), the duration and magnitude of hill start ringing has been reduced.

Figure 19A:
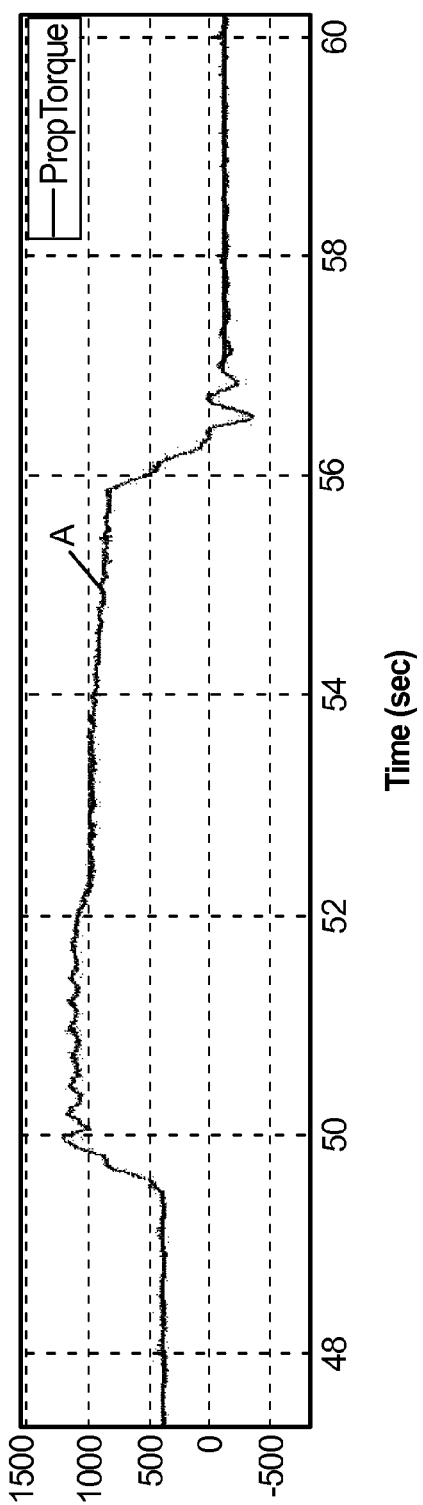
FIG. 19A illustrates a graph associated with hill hold (in which there is baseline damping)

Referring now to FIG. 19A, this figure illustrates a graph associated with hill hold (in which there is baseline damping). In this FIG. 19A, the trace "A" is Shaft Torque (or "Prop Torque").

Figure 19B:
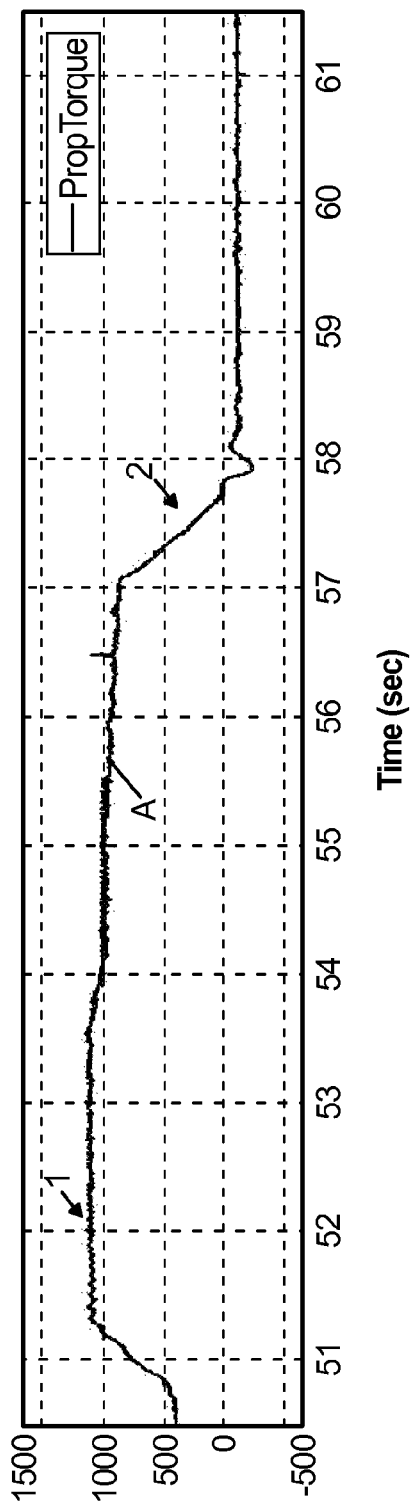
FIG. 19B illustrates a graph associated with hill hold (in which there is improved driveline damping according to an aspect of the present disclosure)

FIG. 19B illustrates a graph associated with hill hold (in which there is improved driveline damping according to an aspect of the present disclosure). In this FIG. 19B, the trace "A" is Shaft Torque (or "Prop Torque"). As seen at arrow 1 of this figure ringing is reduced when entering hill hold. As seen at arrow 2 of this figure, there is a single disturbance without ringing crossing backlash.

Figure 20A:
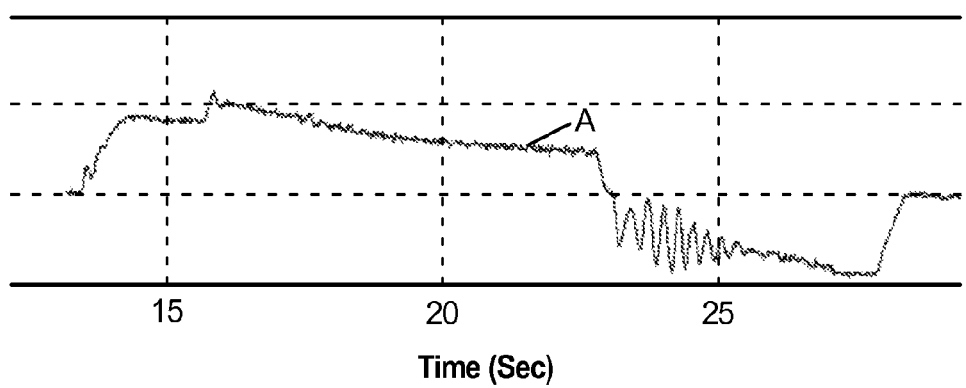
FIG. 20A illustrates a graph associated with limit operation–max motoring/max regeneration (in which there is baseline damping)

Referring now to FIG. 20A, this figure illustrates a graph associated with limit operation—max motoring/max regeneration (in which there is baseline damping). In this FIG. 20A, the trace "A" is Shaft Torque (or "Prop Torque").

Figure 20B:
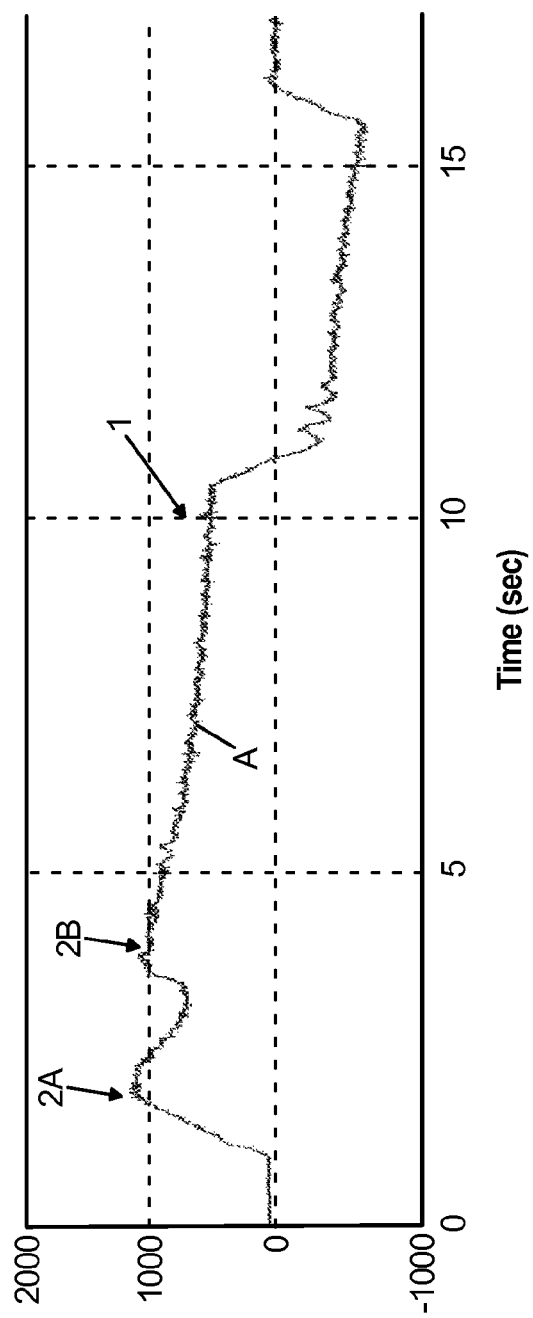
FIG. 20B illustrates a graph associated with limit operation–max motoring/max regeneration (in which there is improved driveline damping according to an aspect of the present disclosure)

Referring now to FIG. 20B, this figure illustrates a graph associated with limit operation—max motoring/max regeneration (in which there is improved driveline damping according to an aspect of the present disclosure). In this FIG. 20B, the trace "A" is Shaft Torque (or "Prop Torque"). As seen at arrow 1 of this figure, oscillations are significantly reduced through backlash. As seen at arrows 2A and 2B of this figure, torque overshoot has been eliminated.

Figure 21:
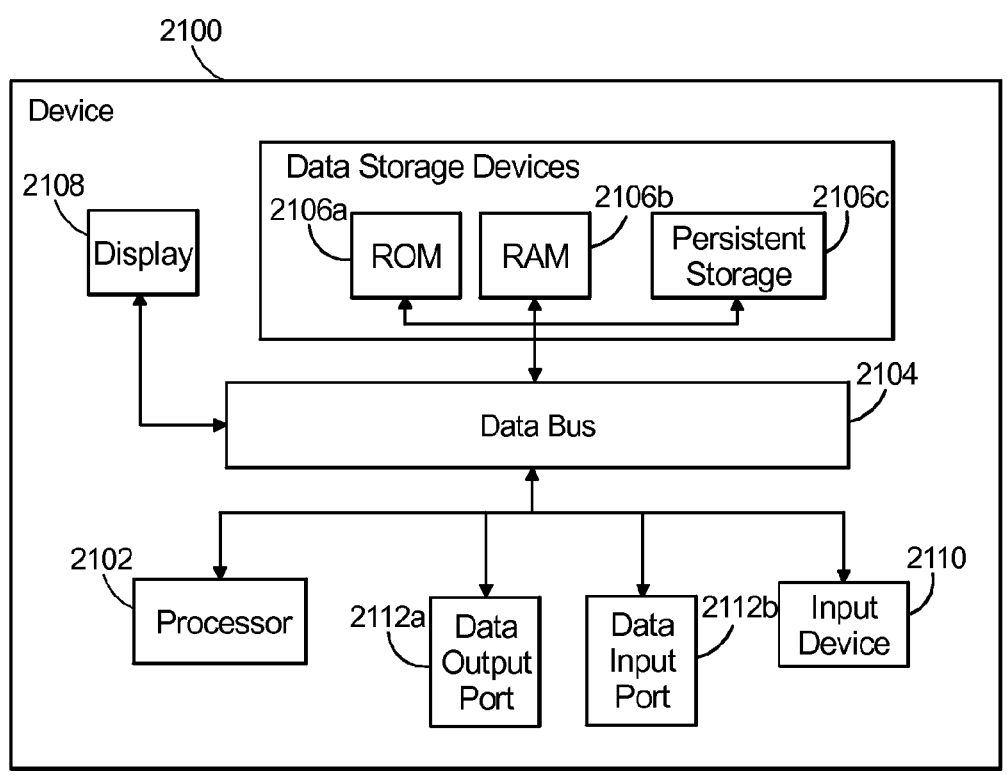
FIG. 21 illustrates a block diagram of a device according to an aspect of the present disclosure.

Referring now to FIG. 21, illustrated is block diagram of a device according to an aspect of the present disclosure. As seen in this FIG. 21, device 2100 includes processor 2102, data bus 2104, ROM 2106a, RAM 2106b, persistent storage 2106c, display 2108, input device 2110, data input port 2112a and data output port 2112b.

Figure 22:
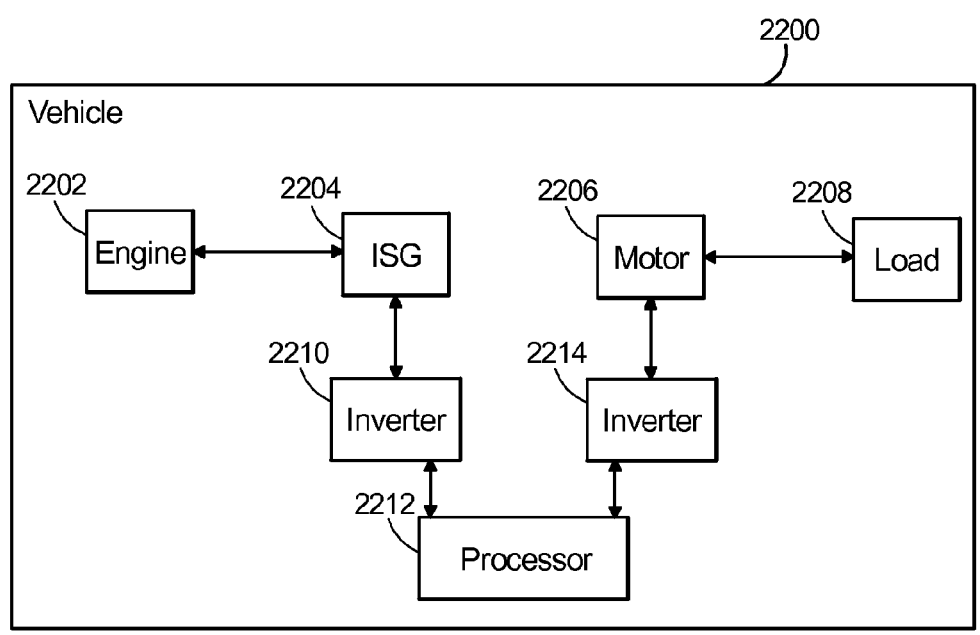
FIG. 22 illustrates a block diagram of a system according to an aspect of the present disclosure.

Referring now to FIG. 22, illustrated is a block diagram of a system according to an aspect of the present disclosure. As seen in this FIG. 22, in one example, implementation may be in a vehicle. The vehicle 2200 may include engine 2202 (connected to integrated starter generator (ISG) 2204). In one example, the integrated starter generator may be of a surface permanent magnet type. The vehicle 2200 may also include motor 2206 (connected to load 2208). Load 2208 may comprise, for example, the remainder of a driveline (excluding motor 2206). In one example, the motor may be of an induction type. Further, inverter 2210 may be disposed between integrated starter generator 2204 and battery 2212 (which may comprise one or more batteries). Further still, inverter 2214 may be disposed between motor 2206 and battery 2212. Further still, in one example inverter 2214 may include therein device 2100 of the type shown in FIG. 21 (the device 2100 may communicate (such as bi-directionally with inverter 2214) via data input port 2112a and data output port 2112b.

Figure 23:
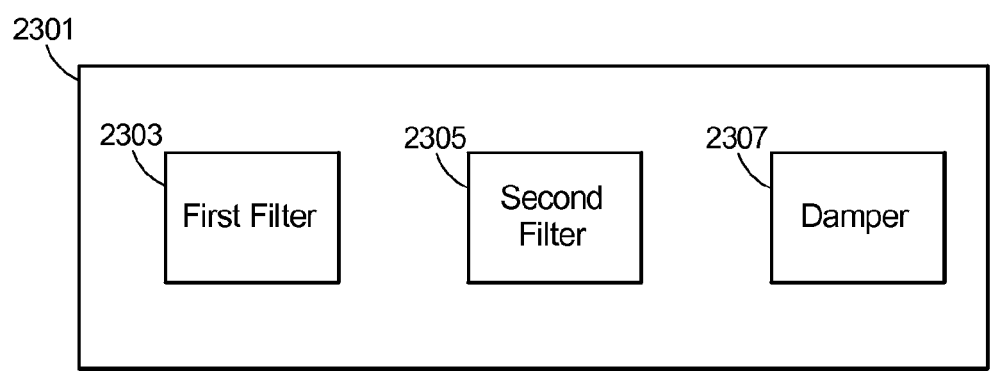
FIG. 23 illustrates a block diagram of a system component according to an aspect of the present disclosure.

Referring now to FIG. 23, illustrated is a block diagram of a system component 2401 according to an aspect of the present disclosure. This system component 2301 is a memory (such as, for example, a type shown in FIG. 21) and includes therein computer readable instructions that, when executed by a processor (such as, for example, a type shown in FIG. 21), implement first filter 2303 (for performing a first state space estimation of a shaft torque), second filter 2305 (for performing a second state space estimation of a load torque) and damper 2307 (for providing torsional damping of the driveline based upon the first state space estimation of the shaft torque and the second state space estimation of the load torque).

Figure 24:
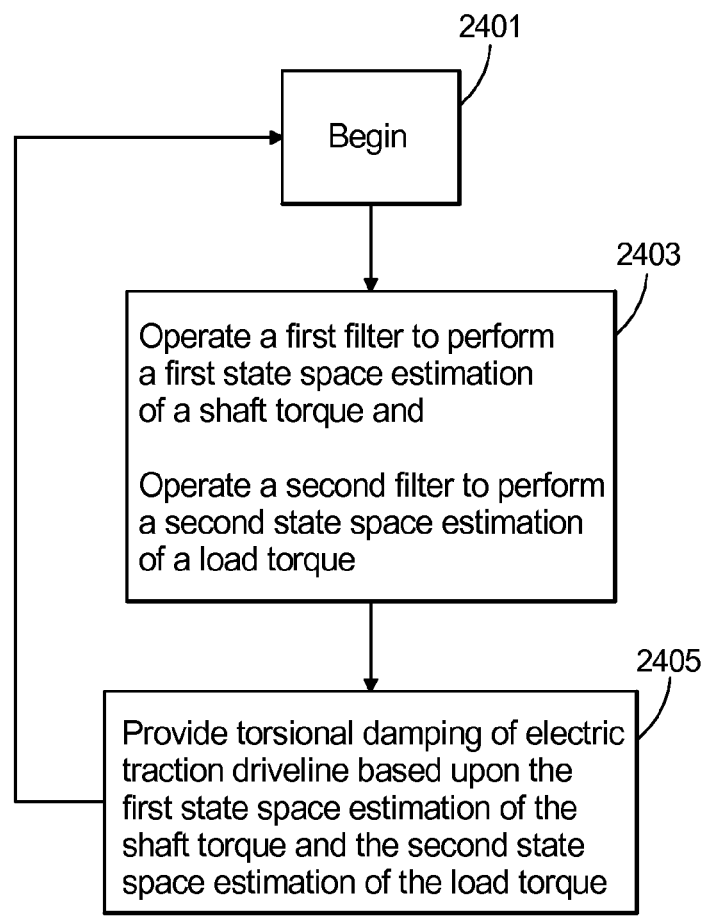
FIG. 24 illustrates a block diagram of a method according to an aspect of the present disclosure.

Referring now to FIG. 24, illustrated is a block diagram of a method according to an aspect of the present disclosure. As seen in this FIG. 24, the process begins at step 2401. At step 2403 a first filter is operated to perform a first state space estimation of a shaft torque and a second filter is operated to perform a second state space estimation of a load torque. Further, at step 2405, torsional damping of the driveline is provided based upon the first state space estimation of the shaft torque and the second state space estimation of the load torque (after step 2405, the method may iteratively repeat at step 2401).

As described herein, in one aspect, dual Kalman filters correct for oscillations to "strip out" the dangerous natural resonances. The dual Kalman filters operate based on measured traction motor speed and commanded traction motor torque. A first Kalman filter can perform a state space estimate of the shaft torque, providing negative feedback to the final torque command in order to eliminate resonant components from the commanded torque and quickly damp external disturbances. A second Kalman filter provides a state space estimation of the load torque or, equivalently, load acceleration. This second Kalman filter can ignore commanded torque and can provide a damping feedback when the wheel speed deviates from the vehicle speed. The combination of these two techniques, in this aspect of the disclosure, enables critically damped driveline control under all drive line disturbances.

Unlike some traditional driveline damping solutions, these dual Kalman filters can directly attenuate the resonant frequency by tracking a state space representation of the driveline. By modeling the driveline with Kalman filters, excellent torsional damping can be obtained even with limited spectral separation from commanded pedal torque dynamics. Further, because the Kalman filter can adapt to errors in both the state space system and measurement quality, in this aspect of the disclosure both commanded and un-commanded oscillations can be damped using only a single low quality position sensor.

In one aspect of the disclosure, the position sensor can be a rotary position sensor which senses rotational speed. The sensor can determine the rotational speed and send it to a system controller. The system controller can send a torque command to an inverter which drives the motor, and a dampening block in the inverter can perform dampening as needed.

Aspects of this disclosure may be utilized in connection with a vehicle (e.g., a bus, a truck, an automobile). In one specific example, aspects of this disclosure may be applied to a hybrid vehicle.

In one embodiment a processor-implemented method for torsional damping of an electric traction driveline is provided, the method comprising: operating a first filter to perform a first state space estimation of a shaft torque; operating a second filter to perform a second state space estimation of a load torque; and providing torsional damping of the electric traction driveline based upon the first state space estimation of the shaft torque and the second state space estimation of the load torque.

In one example, each of the first and second filters is a Kalman filter.

In another example, the electric traction driveline comprises a motor, a load and a shaft connecting the motor and the load.

In another example, the first filter receives a torque value commanded by a user.

In another example, the torsional damping is provided by a change to the torque value commanded by the user.

In another example, the second state space estimation of the load torque is based upon an omega load value output from the second filter and a shaft torque value output from the second filter.

In another example, the shaft torque value output from the second filter is subtracted from a derivative of the omega load value output from the second filter to determine the second state space estimation of the load torque.

In another example, the electric traction driveline is used in a vehicle.

In another embodiment a system for torsional damping of an electric traction driveline is provided, the system comprising: a processor; and a memory storing computer readable instructions that, when executed by the processor, implement: a first filter configured to perform a first state space estimation of a shaft torque; a second filter configured to perform a second state space estimation of a load torque; and a damper configured to provide torsional damping of the electric traction driveline based upon the first state space estimation of the shaft torque and the second state space estimation of the load torque.

In one example, each of the first and second filters is a Kalman filter.

In another example, the electric traction driveline comprises a motor, a load and a shaft connecting the motor and the load.

In another example, the first filter receives a torque value commanded by a user.

In another example, the torsional damping is provided by a change to the torque value commanded by the user.

In another example, the second state space estimation of the load torque is based upon an omega load value output from the second filter and a shaft torque value output from the second filter.

In another example, the shaft torque value output from the second filter is subtracted from a derivative of the omega load value output from the second filter to determine the second state space estimation of the load torque.

In another example, the electric traction driveline is used in a vehicle.

In another embodiment, a computer readable storage device including a computer program for torsional damping of an electric traction driveline is provided, the computer program including instructions for: operating a first filter to perform a first state space estimation of a shaft torque; operating a second filter to perform a second state space estimation of a load torque; and providing torsional damping of the electric traction driveline based upon the first state space estimation of the shaft torque and the second state space estimation of the load torque.

In one example, each of the first and second filters is a Kalman filter.

In another example, the electric traction driveline comprises a motor, a load and a shaft connecting the motor and the load.

In another example, the electric traction driveline is used in a vehicle.

In other examples, any steps described herein may be carried out in any appropriate desired order.

In various aspects of the disclosure, one or more current sensors may be provided in an inverter associated with a machine (e.g., a traction motor or an integrated starter generator (ISG)). In operation (either a motoring operation or a regeneration operation), sensed current may be used to control voltage of the machine (e.g., to control torque of the machine).

In one aspect of the disclosure, a controller (such as a system controller) which receives commanded values (and which provides one or more of the techniques disclosed herein) may be included in an inverter. In another aspect of the disclosure, a controller (such as a system controller) which receives commanded values (and which provides one or more of the techniques disclosed herein) may be distinct from an inverter (e.g., may be part of a vehicle-level controller).

In an aspect of the disclosure, various techniques disclosed herein may be implemented in an FPGA, a microcontroller, and/or in software (e.g., fixed-clock software with a real-time processor).

In an aspect of the disclosure, one or more of the techniques disclosed herein may be applied to any rotating or linear mechanical system that can be modeled as two masses connected by a spring.

In an aspect of the disclosure, a control system includes a processor, at least one data storage device, such as, but not limited to, RAM, ROM and persistent storage, and an external interface. The processor is configured to execute one or more programs stored in a computer readable storage device. The computer readable storage device can be RAM, persistent storage or removable storage. For example, the processor can execute instructions in a program that may be loaded into RAM. The Processor may include one or more processing units. The processor can be, but is not limited to, a CPU or a GPU.

A storage device is any piece of hardware that is capable of storing information, such as, for example without limitation, data, programs, instructions, program code, and/or other suitable information, either on a temporary basis and/or a permanent basis.

In another aspect of the disclosure, an ASIC, FPGA, a PAL and PLA can be used as the processor.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "a control system" and "controller" as may be used in the present disclosure may include a variety of combinations of fixed and/or portable computer hardware, software, peripherals, and storage devices. The controller and/or control system may include a plurality of individual components that are networked or otherwise linked to perform collaboratively, or may include one or more stand-alone components. The hardware and software components of the control system and/or controller of the present disclosure may include and may be included within fixed and portable devices such as desktop, laptop, and/or server, and network of servers (cloud).

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A processor-implemented method for torsional damping of an electric traction driveline, the method comprising:
operating a first Kalman filter to output a state space estimation of a shaft torque;
operating a second Kalman filter to output a state space estimation of a load speed and a shaft torque; and
providing torsional damping of the electric traction driveline by changing a torque command issued to an inverter controller based upon the state space estimation of the shaft torque and the state space estimation of the load speed and the shaft torque, the changing adjusts a rate limited torque value associated with a requested torque by a user of a vehicle by subtracting a value determined from the state space estimation of the shaft torque, and adding a value determined from the state space estimation of the load speed and the shaft torque, the changed rate limited torque value being issued to the inverter controller as the torque command.

2. The method of claim 1, wherein the first Kalman filter receives the rate limited torque value associated with the requested torque by the user and a detected speed of a motor.

3. The method of claim 1, wherein the second Kalman filter receives a detected speed of a motor without receiving the rate limited torque value associated with the requested torque by the user.

4. The method of claim 3, further comprising determining a value determined from the state space estimation of the load speed and the shaft torque, the determining comprising:
   a determining a derivative of the load speed output from the second Kalman filter;
   determining a correction for a torque disturbance on the load by subtracting the derivative from the shaft torque output from the second Kalman filter;
   subjecting the correction for the torque disturbance to a low pass filter and a high pass filter; and
   multiplying the output of the low pass filter and the high pass filter by a gain.

5. A system for torsional damping of an electric traction driveline, the system comprising:
   a processor; and
   a memory storing computer readable instructions that, when executed by the processor, implement:
   a first Kalman filter configured to output a state space estimation of a shaft torque;
   a second Kalman filter configured to output a state space estimation of a load speed and a shaft torque; and
   a damper configured to provide torsional damping of the electric traction driveline by changing a torque command issued to an inverter controller based upon the state space estimation of the shaft torque and the state space estimation of the load speed and the shaft torque, the changing adjusts a rate limited torque value associated with a requested torque by a user of a vehicle by subtracting a value determined from the state space estimation of the shaft torque, and adding a value determined from the state space estimation of the load speed and the shaft torque, the changed rate limited torque value being issued to the inverter controller as the torque command.

6. The system of claim 5, wherein the first Kalman filter receives the rate limited torque value associated with the requested torque by the user and a detected speed of a motor.

7. The system of claim 5, wherein the second Kalman filter receives a detected speed of a motor without receiving the rate limited torque value associated with the requested torque by the user.

8. The system of claim 7, wherein the processor determines the value determined from the state space estimation of the load speed and the shaft torque by
   determining a derivative of the load speed output from the second Kalman filter,
   determining a correction for a torque disturbance on the load by subtracting the derivative from the shaft torque output from the second Kalman filter, subjecting the correction for the torque disturbance to a low pass filter and a high pass filter and multiplying the output of the low pass filter and the high pass filter by a gain.

9. A computer readable storage device including a computer program for torsional damping of an electric traction driveline, the computer program including instructions for:
   operating a first Kalman filter to output a state space estimation of a shaft torque;
   operating a second Kalman filter to output a state space estimation of a load speed and a shaft torque; and
   providing torsional damping of the electric traction driveline by changing a torque command issued to an inverter controller based upon the state space estimation of the shaft torque and the state space estimation of the load speed and the shaft torque, the changing adjusts a rate limited torque value associated with a requested torque by a user of a vehicle by subtracting a value determined from the state space estimation of the shaft torque, and adding a value determined from the state space estimation of the load speed and the shaft torque, the changed rate limited torque value being issued to the inverter controller as the torque command.

10. The method of claim 1, wherein the load comprises wheels.

11. The method of claim 1, further comprising determining the value determined from the state space estimation of the shaft torque, by calculating a derivative of the shaft torque; and multiplying the derivative by a gain.

12. The method of claim 4, wherein the derivative is a band limited derivative.

* * * * *